US012777442B2

(12) United States Patent
Fan et al.

(10) Patent No.: US 12,777,442 B2
(45) Date of Patent: Oct. 27, 2026

(54) COMMUNICATION METHOD AND APPARATUS

(71) Applicant: HUAWEI TECHNOLOGIES CO., LTD., Shenzhen (CN)

(72) Inventors: Bo Fan, Chengdu (CN); Xi Zhang, Chengdu (CN); Shitong Yuan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/591,025

(22) Filed: Feb. 29, 2024

(65) Prior Publication Data

US 2024/0205855 A1 Jun. 20, 2024

Related U.S. Application Data

(63) Continuation of application No. PCT/CN2022/115966, filed on Aug. 30, 2022.

(30) Foreign Application Priority Data

Aug. 31, 2021 (CN) ......................... 202111015739.6
Apr. 27, 2022 (CN) ......................... 202210454297.3

(51) Int. Cl.
*H04W 56/00* (2009.01)
*H04W 74/0833* (2024.01)
*H04W 76/20* (2018.01)

(52) U.S. Cl.
CPC ... *H04W 56/0045* (2013.01); *H04W 56/0015* (2013.01); *H04W 74/0833* (2013.01); *H04W 76/20* (2018.02)

(58) Field of Classification Search
CPC . H04W 74/0838; H04W 72/23; H04W 76/38; H04W 56/0045; H04L 1/1822; H04B 17/328
See application file for complete search history.

(56) References Cited

U.S. PATENT DOCUMENTS

2023/0039610 A1* 2/2023 Wu ........................ H04W 72/23
2023/0217459 A1* 7/2023 Khoshnevisan ....... H04W 72/23 370/329
2023/0276458 A1* 8/2023 Lee ..................... H04W 72/232 370/329

FOREIGN PATENT DOCUMENTS

CN 108702793 A 10/2018
CN 112640543 A 4/2021
(Continued)

OTHER PUBLICATIONS

Extended European Search Report issued in corresponding European Application No. 22863476.2, dated Nov. 22, 2024, pp. 1-5.
(Continued)

*Primary Examiner* — Iqbal Zaidi
(74) *Attorney, Agent, or Firm* — HAUPTMAN HAM, LLP

(57) ABSTRACT

A communication method and apparatus to enable uplink transmission of a terminal to be synchronized with a plurality of stations corresponding to one cell, and avoid a performance loss of uplink transmission. The terminal receives configuration information from a network device, wherein the configuration information includes two timing advance groups (TAGs) corresponding to one cell, and each TAG corresponds to one timing advance (TA). The terminal receives a plurality of random access response messages from the network device, wherein each random access response message is usable to indicate a TA corresponding to one of the two TAGs.

18 Claims, 6 Drawing Sheets

(56) References Cited

FOREIGN PATENT DOCUMENTS

| | | | |
|---|---|---|---|
| WO | 2020215108 | A2 | 10/2020 |
| WO | 2021128309 | A1 | 7/2021 |

OTHER PUBLICATIONS

3rd Generation Partnership Project; Technical Specification Group Radio Access Network; NR; Radio Resource Control (RRC) protocol specification (Release 15), 3GPP TS 38.331 V15.3.0 (Sep. 2018), Technical Specification, total 445 pages.
Samsung:"Enhancements on multi-TRP inter-cell operation", 3GPP TSG RAN WG1 #102, e-Meeting, Aug. 17 28, 2020, R1-2006130, total 3 pages.
3rd Generation Partnership Project; Technical Specification Group Radio Access Network; NR; Physical channels and modulation (Release 15), 3GPP TS 38.211 V15.0.0 (Dec. 2017), Technical Specification, total 73 pages.
3rd Generation Partnership Project; Technical Specification Group Radio Access Network; NR; Multiplexing and channel coding (Release 15), 3GPP TS 38.212 V15.0.0 (Dec. 2017), Technical Specification, total 82 pages.
3rd Generation Partnership Project; Technical Specification Group Radio Access Network; NR; Physical layer procedures for control (Release 15), 3GPP TS 38.213 V15.0.0 (Dec. 2017), Technical Specification, total 56 pages.
3rd Generation Partnership Project; Technical Specification Group Radio Access Network; NR; Physical layer procedures for data (Release 15), 3GPP TS 38.214 V15.0.0 (Dec. 2017), Technical Specification, total 71 pages.
International Search Report issued in corresponding International Application No. PCT/CN2022/115966, dated Nov. 30, 2022, pp. 1-10.
Chinese First Office Action issued in corresponding Chinese Application No. 202210454297.3, dated May 21, 2025, pp. 1-16.
Office Action issued in CN202210454297.3 dated Sep. 30, 2025.

* cited by examiner

COMMUNICATION METHOD AND APPARATUS

CROSS-REFERENCE TO RELATED APPLICATIONS

This application is a continuation of International Application No. PCT/CN2022/115966, filed on Aug. 30, 2022, which claims priority to Chinese Patent Application No. 202111015739.6, filed on Aug. 31, 2021 and Chinese Patent Application No. 202210454297.3, filed on Apr. 27, 2022. All of the aforementioned patent applications are hereby incorporated by reference in their entireties.

TECHNICAL FIELD

This application relates to the communication field, and in particular, to a communication method and apparatus.

BACKGROUND

In a 5$^{th}$ generation (5G) mobile communication system, before performing uplink data transmission, each terminal obtains an uplink timing advance (TA) of a cell (cell) in which the terminal is located. Each terminal sends an uplink signal to a same station based on a TA of the terminal, to ensure that uplink signals of a plurality of terminals arrive at the station at the same time, that is, to ensure that all the terminals implement uplink synchronization. In this way, the station successfully receives the uplink signal of each terminal.

However, in response to one cell of a network device corresponding to a plurality of stations, uplink transmission is to be performed with the plurality of stations at the same time. Because distances between the terminal and the plurality of stations are usually unequal, the uplink signal sent by the terminal based on a TA of the cell or uplink transmission of the terminal cannot be synchronized with the plurality of stations. Consequently, a performance loss of uplink transmission is caused.

SUMMARY

Embodiments described herein provide a communication method and apparatus, to enable uplink transmission of a terminal to be synchronized with a plurality of stations corresponding to one cell, and avoid a performance loss of uplink transmission.

The following technical solutions are used in at least one embodiment.

According to a first aspect, a communication method is provided. The method includes: A terminal determines a first TA or a first timing advance group (TAG), to send a corresponding uplink signal to a network device based on the first TA or the first TAG. The first TA is one of a plurality of TAs corresponding to one cell of the network device, and the first TAG is one of a plurality of TAGs corresponding to one cell of the network device.

The method according to the first aspect in response to one cell of the network device corresponding to a plurality of stations, the terminal configures a plurality of TAs or a plurality of TAGs corresponding to the cell. In this way, in response to performing uplink transmission with a station of the network device, the terminal selects a proper TA or TAG, for example, the first TA or the first TAG, to send the corresponding uplink signal, to enable uplink transmission of the terminal to be synchronized with the plurality of stations and avoid a performance loss of uplink transmission.

In a at least one embodiment, the first TA or the first TAG is determined based on first information, and the first information indicates the first TA or the first TAG corresponding to the uplink signal. In other words, the network device indicates a currently used TA or TAG by using the first information based on an actual situation, to implement more flexible TA or TAG selection. A selected TA or TAG better matches an uplink transmission distance of the terminal, and uplink transmission is more stable.

Optionally, the first information is carried in one or more of the following: a radio resource control (RRC) message, a medium access control-control element (MAC-CE) message, a downlink control information (DCI) message, a spatial relationship, a transmission configuration indication (TCI) state, or quasi-colocation (QCL) information.

In another at least one embodiment, the first TA or the first TAG is determined based on a first signal, and the first signal is a synchronization signal and physical broadcast channel block (SSB), a spatial relationship reference signal, or a path loss reference signal corresponding to the uplink signal. In other words, the terminal determines the first TA or the first TAG based on a spatial relationship between signals, and the network device does not need to additionally indicate the first TA or the first TAG. In this way, a quantity of interactions between the network device and the terminal is reduced, thereby reducing communication overheads, and improving communication efficiency.

Optionally, the method according to the first aspect further includes: The terminal receives second information from the network device. The second information indicates the first signal.

Further, the second information is QCL information, and a type of the QCL information includes one or more of the following: a type A, a type B, a type C, a type D, a type E, a type F, or a type G. In other words, the first signal is indicated by a type field in QCL information. In this way, signaling multiplexing is implemented, so that the communication overheads are reduced and the communication efficiency is improved.

Optionally, the first signal includes one or more of the following: a sounding reference signal (SRS), an SSB, a channel state information reference signal (CSI-RS), a tracking reference signal (TRS), a physical downlink control channel (PDCCH), a physical downlink shared channel (PDSCH), a physical uplink control channel (PUCCH), or a physical uplink shared channel (PUSCH).

Optionally, an association relationship exists between the first signal and the first TA or the first TAG, so that the terminal accurately determines the first TA or the first TAG based on the association relationship.

In a at least one embodiment, a first TA or a first TAG is determined based on a first signal, an association relationship exists between the first signal and the first TA or the first TAG, and the first signal is an SSB, a spatial relationship reference signal, or a path loss reference signal corresponding to an uplink signal.

In a at least one embodiment, before that a terminal determines a first TA or a first TAG, the method according to the first aspect further includes: The terminal receives configuration information from the network device. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the plurality of TA offsets are in one-to-one correspondence with the plurality of TAGs.

Optionally, before that a terminal determines a first TA or a first TAG, the method according to the first aspect further includes: The terminal receives a random access response (RAR) message from the network device. The RAR message includes an initial TA value corresponding to the first TAG, and the initial TA value corresponding to the first TAG and the TA offset corresponding to the first TAG are used to determine a TA corresponding to the first TAG.

Further, the method according to the first aspect further includes: The terminal determines, based on a field in the RAR message, a TAG corresponding to an initial TA value in the RAR message. Alternatively, the terminal determines, based on an SSB corresponding to the RAR message, a TAG corresponding to an initial TA value in the RAR message.

Further, the SSB corresponding to the RAR message is associated with one TAG, and that the terminal determines, based on an SSB corresponding to the RAR message, a TAG corresponding to an initial TA value in the RAR message includes: The terminal determines that the TAG associated with the SSB is the TAG corresponding to the initial TA value in the RAR message. The network device configures, for the terminal, a TA offset and an initial TA value that correspond to a TAG, so that the terminal determines a TA corresponding to each TAG. In this way, even in response to the network device indicating only a TAG, the terminal determines a corresponding TA based on the TAG, so that uplink synchronization is implemented.

In a at least one embodiment, the uplink signal includes one or more of the following: an SRS, a PUSCH, or a PUCCH.

According to a second aspect, a communication method is provided. The method includes: A terminal receives first information from a network device, and sends an uplink signal to the network device based on a first TA or a first TAG. The first information indicates the first TA or the first TAG corresponding to the uplink signal. The first TA is one of a plurality of TAs corresponding to one cell of the network device, and the first TAG is one of a plurality of TAGs corresponding to one cell of the network device.

In a at least one embodiment, the first information is carried in one or more of the following: an RRC message, a MAC-CE message, a DCI message, a spatial relationship, a TCI state, or QCL information.

In a at least one embodiment, before that a terminal sends an uplink signal to the network device based on a first TA or a first TAG, the method according to the second aspect further includes: The terminal receives configuration information from the network device. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the plurality of TA offsets are in one-to-one correspondence with the plurality of TAGs.

Optionally, before that a terminal sends an uplink signal to the network device based on a first TA or a first TAG, the method according to the second aspect further includes: The terminal receives a RAR message from the network device. The RAR message includes an initial TA value corresponding to the first TAG, and the initial TA value corresponding to the first TAG and the TA offset corresponding to the first TAG are used to determine a TA corresponding to the first TAG.

Further, the method according to the second aspect further includes: The terminal determines, based on a field in the RAR message, a TAG corresponding to an initial TA value in the RAR message. Alternatively, the terminal determines, based on an SSB corresponding to the RAR message, a TAG corresponding to an initial TA value in the RAR message.

Further, the SSB corresponding to the RAR message is associated with one TAG, and that the terminal determines, based on an SSB corresponding to the RAR message, a TAG corresponding to an initial TA value in the RAR message includes: The terminal determines that the TAG associated with the SSB is the TAG corresponding to the initial TA value in the RAR message. In a at least one embodiment, the uplink signal includes one or more of the following: an SRS, a PUSCH, or a PUCCH.

In addition, for technical effects of the method according to the second aspect, refer to the technical effects of the method according to the first aspect. Details are not described herein again.

According to a third aspect, a communication method is provided. The method includes: A terminal determines a first TA or a first TAG based on a first signal, to send a corresponding uplink signal to a network device based on the first TA or the first TAG. The first signal is an SSB, a spatial relationship reference signal, or a path loss reference signal corresponding to the uplink signal. The first TA is one of a plurality of TAs corresponding to one cell of the network device, and the first TAG is one of a plurality of TAGs corresponding to one cell of the network device.

Optionally, the method according to the third aspect further includes: The terminal receives second information from the network device. The second information indicates the first signal.

Further, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, an association relationship exists between the first signal and the first TA or the first TAG.

In a at least one embodiment, a first TA or a first TAG is determined based on a first signal, an association relationship exists between the first signal and the first TA or the first TAG, and the first signal is an SSB, a spatial relationship reference signal, or a path loss reference signal corresponding to an uplink signal.

In a at least one embodiment, before that a terminal determines a first TA or a first TAG based on a first signal, the method according to the third aspect further includes: The terminal receives configuration information from the network device. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the plurality of TA offsets are in one-to-one correspondence with the plurality of TAGs.

Optionally, before that a terminal determines a first TA or a first TAG based on a first signal, the method according to the third aspect further includes: The terminal receives a RAR message from the network device. The RAR message includes an initial TA value corresponding to the first TAG, and the initial TA value corresponding to the first TAG and the TA offset corresponding to the first TAG are used to determine a TA corresponding to the first TAG.

Further, the method according to the third aspect further includes: The terminal determines, based on a field in the RAR message, a TAG corresponding to an initial TA value in the RAR message. Alternatively, the terminal determines, based on an SSB corresponding to the RAR message, a TAG corresponding to an initial TA value in the RAR message.

Further, the SSB corresponding to the RAR message is associated with one TAG, and that the terminal determines, based on an SSB corresponding to the RAR message, a TAG corresponding to an initial TA value in the RAR message includes: The terminal determines that the TAG associated with the SSB is the TAG corresponding to the initial TA value in the RAR message.

In a at least one embodiment, the uplink signal includes one or more of the following: an SRS, a PUSCH, or a PUCCH.

In addition, for technical effects of the method according to the third aspect, refer to the technical effects of the method according to the first aspect. Details are not described herein again.

According to a fourth aspect, a communication method is provided. The method includes: A network device sends configuration information to a terminal, and receives an uplink signal from the terminal. The configuration information includes one or more of the following: a plurality of TAGs corresponding to one cell of the network device or a plurality of TA offsets corresponding to one cell of the network device.

In a at least one embodiment, before that a network device receives an uplink signal from the terminal, the method according to the fourth aspect further includes: The network device sends first information to the terminal. The first information indicates a first TA or a first TAG corresponding to the uplink signal, the first TAG is one of the plurality of TAGs, and the first TA is one TA corresponding to one of the plurality of TA offsets.

Optionally, the first information is carried in one or more of the following: an RRC message, a MAC-CE message, a DCI message, a spatial relationship, a TCI state, or QCL information.

In another at least one embodiment, before that a network device receives an uplink signal from the terminal, the method according to the fourth aspect further includes: The network device sends second information to the terminal. The second information indicates a first signal, the first signal is an SSB, a spatial relationship reference signal, or a path loss reference signal corresponding to the uplink signal, the first signal is used to determine a first TA or a first TAG corresponding to the uplink signal, the first TAG is one of the plurality of TAGs, and the first TA is one TA corresponding to one of the plurality of TA offsets.

Optionally, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, the configuration information further includes an association relationship between the first signal and the first TA or the first TAG.

In a at least one embodiment, before that a network device receives an uplink signal from the terminal, the method according to the fourth aspect further includes: The network device sends a RAR message to the terminal. The RAR message includes an initial TA value corresponding to the first TAG.

Optionally, a field in the RAR message is used to determine a TAG corresponding to an initial TA value in the RAR message; or an SSB corresponding to the RAR message is used to determine a TAG corresponding to an initial TA value in the RAR message.

Further, the SSB corresponding to the RAR message is associated with one TAG, and the TAG associated with the SSB is the TAG corresponding to the initial TA value in the RAR message.

In a at least one embodiment, the uplink signal includes one or more of the following: an SRS, a PUSCH, or a PUCCH.

In a at least one embodiment, each of the plurality of TA offsets corresponds to at least a part of the plurality of TAGs.

Optionally, the plurality of TA offsets are in one-to-one correspondence with the plurality of TAGs.

In addition, for technical effects of the method according to the fourth aspect, refer to the technical effects of the method according to the first aspect. Details are not described herein again.

According to a fifth aspect, a communication apparatus is provided. The apparatus includes modules configured to perform the method according to the first aspect, for example, a processing module and a transceiver module. The processing module is configured to determine a first TA or a first TAG, to control, based on the first TA or the first TAG, the transceiver module to send a corresponding uplink signal to a network device. The first TA is one of a plurality of TAs corresponding to one cell of the network device, and the first TAG is one of a plurality of TAGs corresponding to one cell of the network device.

In a at least one embodiment, the first TA or the first TAG is determined based on first information, and the first information indicates the first TA or the first TAG corresponding to the uplink signal.

Optionally, the first information is carried in one or more of the following: an RRC message, a MAC-CE message, a DCI message, a spatial relationship, a TCI state, or QCL information.

In another at least one embodiment, the first TA or the first TAG is determined based on a first signal, and the first signal is an SSB, a spatial relationship reference signal, or a path loss reference signal corresponding to the uplink signal.

Optionally, the transceiver module is further configured to receive second information from the network device. The second information indicates the first signal.

Further, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, an association relationship exists between the first signal and the first TA or the first TAG.

In a at least one embodiment, a first TA or a first TAG is determined based on a first signal, an association relationship exists between the first signal and the first TA or the first TAG, and the first signal is an SSB, a spatial relationship reference signal, or a path loss reference signal corresponding to an uplink signal.

In a at least one embodiment, the transceiver module is further configured to receive configuration information from the network device before the processing module determines the first TA or the first TAG. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the plurality of TA offsets are in one-to-one correspondence with the plurality of TAGs.

Optionally, the transceiver module is further configured to receive a RAR message from the network device before the processing module determines the first TA or the first TAG. The RAR message includes an initial TA value corresponding to the first TAG, and the initial TA value corresponding to the first TAG and the TA offset corresponding to the first TAG are used to determine a TA corresponding to the first TAG.

Further, the processing module is further configured to determine, based on a field in the RAR message, a TAG corresponding to an initial TA value in the RAR message. Alternatively, the processing module is further configured to determine, based on an SSB corresponding to the RAR message, a TAG corresponding to an initial TA value in the RAR message.

Further, the SSB corresponding to the RAR message is associated with one TAG, and the processing module is further configured to determine that the TAG associated with the SSB is the TAG corresponding to the initial TA value in the RAR message.

In a at least one embodiment, the uplink signal includes one or more of the following: an SRS, a PUSCH, or a PUCCH.

Optionally, the transceiver module alternatively includes a sending module and a receiving module. The sending module is configured to implement a sending function of the apparatus according to the fifth aspect, and the receiving module is configured to implement a receiving function of the apparatus according to the fifth aspect.

Optionally, the apparatus according to the fifth aspect further includes a storage module, and the storage module stores a program or instructions. In response to the processing module executing the program or the instructions, the apparatus is enabled to perform the method according to the first aspect.

The apparatus according to the fifth aspect is a terminal, is a chip (system) or another part or component that is disposed in the terminal, or is an apparatus including the terminal. This is not limited in at least one embodiment.

In addition, for technical effects of the apparatus according to the fifth aspect, refer to the technical effects of the method according to the first aspect. Details are not described herein again.

According to a sixth aspect, a communication apparatus is provided. The apparatus includes modules configured to perform the method according to the second aspect, for example, a processing module and a transceiver module. The transceiver module is configured to receive first information from a network device. The processing module is configured to control, based on a first TA or a first TAG, the transceiver module to send an uplink signal to the network device. The first information indicates the first TA or the first TAG corresponding to the uplink signal. The first TA is one of a plurality of TAs corresponding to one cell of the network device, and the first TAG is one of a plurality of TAGs corresponding to one cell of the network device.

In a at least one embodiment, the first information is carried in one or more of the following: an RRC message, a MAC-CE message, a DCI message, a spatial relationship, a TCI state, or QCL information.

In a at least one embodiment, the transceiver module is further configured to receive configuration information from the network device before the processing module controls, based on the first TA or the first TAG, the transceiver module to send the uplink signal to the network device. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the plurality of TA offsets are in one-to-one correspondence with the plurality of TAGs.

Optionally, the transceiver module is further configured to receive a RAR message from the network device before the processing module controls, based on the first TA or the first TAG, the transceiver module to send the uplink signal to the network device. The RAR message includes an initial TA value corresponding to the first TAG, and the initial TA value corresponding to the first TAG and the TA offset corresponding to the first TAG are used to determine a TA corresponding to the first TAG.

Further, the processing module is further configured to determine, based on a field in the RAR message, a TAG corresponding to an initial TA value in the RAR message. Alternatively, the processing module is further configured to determine, based on an SSB corresponding to the RAR message, a TAG corresponding to an initial TA value in the RAR message.

Further, the SSB corresponding to the RAR message is associated with one TAG, and the processing module is further configured to determine that the TAG associated with the SSB is the TAG corresponding to the initial TA value in the RAR message. In a at least one embodiment, the uplink signal includes one or more of the following: an SRS, a PUSCH, or a PUCCH.

Optionally, the transceiver module alternatively includes a sending module and a receiving module. The sending module is configured to implement a sending function of the apparatus according to the sixth aspect, and the receiving module is configured to implement a receiving function of the apparatus according to the sixth aspect.

Optionally, the apparatus according to the sixth aspect further includes a storage module, and the storage module stores a program or instructions. In response to the processing module executing the program or the instructions, the apparatus is enabled to perform the method according to the second aspect.

The apparatus according to the sixth aspect is a terminal, is a chip (system) or another part or component that is disposed in the terminal, or is an apparatus including the terminal. This is not limited in at least one embodiment.

In addition, for technical effects of the apparatus according to the sixth aspect, refer to the technical effects of the method according to the first aspect. Details are not described herein again.

According to a seventh aspect, a communication apparatus is provided. The apparatus includes modules configured to perform the method according to the third aspect, for example, a processing module and a transceiver module. The processing module is configured to determine a first TA or a first TAG based on a first signal, to control, based on the first TA or the first TAG, the transceiver module to send a corresponding uplink signal to a network device. The first signal is an SSB, a spatial relationship reference signal, or a path loss reference signal corresponding to the uplink signal. The first TA is one of a plurality of TAs corresponding to one cell of the network device, and the first TAG is one of a plurality of TAGs corresponding to one cell of the network device.

Optionally, the transceiver module is further configured to receive second information from the network device. The second information indicates the first signal.

Further, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, an association relationship exists between the first signal and the first TA or the first TAG.

In a at least one embodiment, a first TA or a first TAG is determined based on a first signal, an association relationship exists between the first signal and the first TA or the first TAG, and the first signal is an SSB, a spatial relationship reference signal, or a path loss reference signal corresponding to an uplink signal.

In a at least one embodiment, the transceiver module is further configured to receive configuration information from the network device before the processing module determines the first TA or the first TAG based on the first signal. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the plurality of TA offsets are in one-to-one correspondence with the plurality of TAGs.

Optionally, the transceiver module is further configured to receive a RAR message from the network device before the processing module determines the first TA or the first TAG based on the first signal. The RAR message includes an initial TA value corresponding to the first TAG, and the initial TA value corresponding to the first TAG and the TA offset corresponding to the first TAG are used to determine a TA corresponding to the first TAG.

Further, the processing module is further configured to determine, based on a field in the RAR message, a TAG corresponding to an initial TA value in the RAR message. Alternatively, the processing module is further configured to determine, based on an SSB corresponding to the RAR message, a TAG corresponding to an initial TA value in the RAR message.

Further, the SSB corresponding to the RAR message is associated with one TAG, and the processing module is further configured to determine that the TAG associated with the SSB is the TAG corresponding to the initial TA value in the RAR message. In a at least one embodiment, the uplink signal includes one or more of the following: an SRS, a PUSCH, or a PUCCH.

Optionally, the transceiver module alternatively includes a sending module and a receiving module. The sending module is configured to implement a sending function of the apparatus according to the seventh aspect, and the receiving module is configured to implement a receiving function of the apparatus according to the seventh aspect.

Optionally, the apparatus according to the seventh aspect further includes a storage module, and the storage module stores a program or instructions. In response to the processing module executing the program or the instructions, the apparatus is enabled to perform the method according to the third aspect.

The apparatus according to the seventh aspect is a terminal, is a chip (system) or another part or component that is disposed in the terminal, or is an apparatus including the terminal. This is not limited in at least one embodiment.

In addition, for technical effects of the apparatus according to the seventh aspect, refer to the technical effects of the method according to the first aspect. Details are not described herein again.

According to an eighth aspect, a communication apparatus is provided. The apparatus includes modules configured to perform the method according to the fourth aspect, for example, a sending module and a receiving module. The sending module is configured to send configuration information to a terminal. The receiving module is configured to receive an uplink signal from the terminal. The configuration information includes one or more of the following: a plurality of TAGs corresponding to one cell of a network device or a plurality of TA offsets corresponding to one cell of the network device.

In a at least one embodiment, the sending module is further configured to send first information to the terminal before the receiving module receives the uplink signal from the terminal. The first information indicates a first TA or a first TAG corresponding to the uplink signal, the first TAG is one of the plurality of TAGs, and the first TA is one TA corresponding to one of the plurality of TA offsets.

Optionally, the first information is carried in one or more of the following: an RRC message, a MAC-CE message, a DCI message, a spatial relationship, a TCI state, or QCL information.

In another at least one embodiment, the sending module is further configured to send second information to the terminal before the receiving module receives the uplink signal from the terminal. The second information indicates a first signal, the first signal is an SSB, a spatial relationship reference signal, or a path loss reference signal corresponding to the uplink signal, the first signal is used to determine a first TA or a first TAG corresponding to the uplink signal, the first TAG is one of the plurality of TAGs, and the first TA is one TA corresponding to one of the plurality of TA offsets.

Optionally, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, the configuration information further includes an association relationship between the first signal and the first TA or the first TAG.

In a at least one embodiment, the sending module is further configured to send a RAR message to the terminal before the receiving module receives the uplink signal from the terminal. The RAR message includes an initial TA value corresponding to the first TAG.

Optionally, a field in the RAR message is used to determine a TAG corresponding to an initial TA value in the RAR message; or an SSB corresponding to the RAR message is used to determine a TAG corresponding to an initial TA value in the RAR message.

Further, the SSB corresponding to the RAR message is associated with one TAG, and the TAG associated with the SSB is the TAG corresponding to the initial TA value in the RAR message.

In a at least one embodiment, the uplink signal includes one or more of the following: an SRS, a PUSCH, or a PUCCH.

In a at least one embodiment, each of the plurality of TA offsets corresponds to at least a part of the plurality of TAGs.

Optionally, the plurality of TA offsets are in one-to-one correspondence with the plurality of TAGs.

Optionally, the sending module and the receiving module are integrated into one module, for example, a transceiver module. The transceiver module is configured to implement a sending function and a receiving function of the apparatus according to the eighth aspect.

Optionally, the apparatus according to the eighth aspect further includes a processing module. The processing module is configured to implement a processing function of the apparatus.

Optionally, the apparatus according to the eighth aspect further includes a storage module, and the storage module stores a program or instructions. In response to the processing module executing the program or the instructions, the apparatus is enabled to perform the method according to the fourth aspect.

The apparatus according to the eighth aspect is a network device, is a chip (system) or another part or component that is disposed in the network device, or is an apparatus including the network device. This is not limited in at least one embodiment.

In addition, for technical effects of the apparatus according to the eighth aspect, refer to the technical effects of the method according to the first aspect. Details are not described herein again.

According to a ninth aspect, a communication apparatus is provided. The apparatus includes a processor. The processor is configured to perform the method according to any one of the first aspect to the fourth aspect.

In a at least one embodiment, the apparatus according to the ninth aspect further includes a transceiver. The transceiver is a transceiver circuit or an interface circuit. The transceiver is used by the apparatus to communicate with another apparatus.

In a at least one embodiment, the apparatus according to the ninth aspect further includes a memory. The memory and the processor are integrated together, or are disposed separately. The memory is configured to store a computer program and/or data related to the method according to any one of the first aspect to the fifth aspect.

In at least one embodiment, the apparatus according to the ninth aspect is the terminal according to the first aspect, the second aspect, or the third aspect, is the network device according to the fourth aspect, is a chip (system) or another part or component that is disposed in the terminal or the network device, or is an apparatus including the terminal or the network device.

In addition, for technical effects of the apparatus according to the ninth aspect, refer to the technical effects of the method according to any one of the first aspect to the fourth aspect. Details are not described herein again.

According to a tenth aspect, a communication apparatus is provided. The apparatus includes a processor and a memory. The memory is configured to store computer instructions, and in response to the processor executing the instructions, the apparatus is enabled to perform the method according to any one of the first aspect to the fourth aspect.

In a at least one embodiment, the apparatus according to the tenth aspect further includes a transceiver. The transceiver is a transceiver circuit or an interface circuit. The transceiver is used by the apparatus to communicate with another apparatus.

In at least one embodiment, the apparatus according to the tenth aspect is the terminal according to the first aspect, the second aspect, or the third aspect, is the network device according to the fourth aspect, is a chip (system) or another part or component that is disposed in the terminal or the network device, or is an apparatus including the terminal or the network device.

In addition, for technical effects of the apparatus according to the tenth aspect, refer to the technical effects of the method according to any one of the first aspect to the fourth aspect. Details are not described herein again.

According to an eleventh aspect, a communication apparatus is provided. The apparatus includes a logic circuit and an input/output interface. The input/output interface is configured to receive code instructions and transmit the code instructions to the logic circuit. The logic circuit is configured to run the code instructions to perform the method according to any one of the first aspect to the fourth aspect.

In a at least one embodiment, the apparatus according to the eleventh aspect further includes a memory. The memory and the processor are integrated together, or are disposed separately. The memory is configured to store a computer program and/or data related to the method according to any one of the first aspect to the fourth aspect.

In at least one embodiment, the apparatus according to the eleventh aspect is the terminal according to the first aspect, the second aspect, or the third aspect, is the network device according to the fourth aspect, is a chip (system) or another part or component that is disposed in the terminal or the network device, or is an apparatus including the terminal or the network device.

In addition, for technical effects of the apparatus according to the eleventh aspect, refer to the technical effects of the method according to any one of the first aspect to the fourth aspect. Details are not described herein again.

According to a twelfth aspect, a communication apparatus is provided. The apparatus includes a processor and a transceiver. The transceiver is configured to exchange information between the communication apparatus and another apparatus, and the processor executes program instructions to perform the method according to any one of the first aspect to the fourth aspect.

In a at least one embodiment, the apparatus according to the twelfth aspect further includes a memory. The memory and the processor are integrated together, or are disposed separately. The memory is configured to store a computer program and/or data related to the method according to any one of the first aspect to the fourth aspect.

In at least one embodiment, the apparatus according to the twelfth aspect is the terminal according to the first aspect, the second aspect, or the third aspect, is the network device according to the fourth aspect, is a chip (system) or another part or component that is disposed in the terminal or the network device, or is an apparatus including the terminal or the network device.

In addition, for technical effects of the apparatus according to the twelfth aspect, refer to the technical effects of the method according to any one of the first aspect to the fourth aspect. Details are not described herein again.

According to a thirteenth aspect, a communication system is provided. The communication system includes a terminal and a network device. The terminal is configured to perform the method according to the first aspect, the second aspect, or the third aspect. The network device is configured to perform the method according to the fourth aspect.

According to a fourteenth aspect, a computer-readable storage medium is provided, including a computer program or instructions. In response to the computer program or the instructions running on a computer, the method according to any one of the first aspect to the fourth aspect is performed.

According to a fifteenth aspect, a computer program product is provided, including a computer program or instructions. In response to the computer program or the instructions running on a computer, the method according to any one of the first aspect to the fifth aspect is performed.

DESCRIPTION OF EMBODIMENTS

Figure 1:
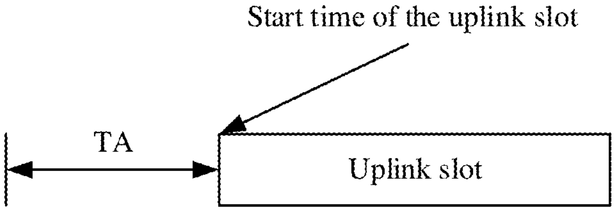
FIG. 1 is a schematic diagram of a time domain location relationship between a TA and an uplink slot.

The following describes technical terms in at least one embodiment.

1. Beam

In a protocol, the beam is represented as a spatial domain filter (spatial domain filter), a spatial filter (spatial filter), a spatial domain parameter (spatial domain parameter), a spatial parameter (spatial parameter), a spatial domain setting (spatial domain setting), a spatial setting (spatial setting), QCL information, a QCL assumption, a QCL indication, or the like. The beam is indicated by using a TCI state parameter or a spatial relationship (spatial relationship) parameter. Therefore, in at least one embodiment, the beam is replaced with the spatial domain filter, the spatial filter, the spatial domain parameter, the spatial parameter, the spatial domain setting, the spatial setting, the QCL information, the QCL assumption, the QCL indication, a TCI state (a DL TCI state or a UL TCI state), a spatial relationship, or the like. The foregoing terms are also equivalent to each other. Alternatively, the beam is replaced with another term for representing the beam. This is not limited in at least one embodiment.

A beam used to send a signal is referred to as a transmission beam (Tx beam), for example, an uplink transmission beam or a downlink transmission beam, or is referred to as a spatial domain transmission filter (spatial domain transmission filter), a spatial transmission filter (spatial transmission filter), a spatial domain transmission parameter (spatial domain transmission parameter), a spatial transmission parameter (spatial transmission parameter), a spatial domain transmission setting (spatial domain transmission setting), or a spatial transmission setting (spatial transmission setting). The downlink transmission beam is indicated by using the TCI state.

A beam used to receive a signal is referred to as a reception beam (Rx beam), for example, an uplink reception beam or a downlink reception beam, or is referred to as a spatial domain reception filter (spatial domain reception filter), a spatial reception filter (spatial reception filter), a spatial domain reception parameter (spatial domain reception parameter), a spatial reception parameter (spatial reception parameter), a spatial domain reception setting (spatial domain reception setting), or a spatial reception setting (spatial reception setting). The transmission beam is indicated by using the spatial relationship, the uplink TCI state, or an SRS resource (indicating that a transmission beam of an SRS is used). The uplink transmission beam is alternatively replaced with the SRS resource.

The transmission beam is alternatively distribution of signal strength formed in different directions in space after a signal is transmitted through an antenna, and the reception beam is alternatively distribution of signal strength, in different directions in space, of a radio signal received from an antenna.

In addition, the beam is a wide beam, a narrow beam, or a beam of another type. A technology for forming the beam is a beamforming technology or another technology. The beamforming technology is specifically a digital beamforming technology, an analog beamforming technology, a hybrid digital/analog beamforming technology, or the like.

The beam usually corresponds to a resource. For example, during beam measurement, a network device measures different beams by using different resources, a terminal feeds back measured resource quality, and the network device knows quality of a corresponding beam. During data transmission, beam information is also indicated by using a resource corresponding to the beam information. For example, the network device indicates information about a PDSCH beam of the terminal by using a TCI field in DCI.

Optionally, a plurality of beams having same or similar communication features are considered as one beam. One beam includes one or more antenna ports, configured to transmit a data channel, a control channel, a sounding signal, and the like. The one or more antenna ports forming the beam is also considered as one antenna port set. During beam measurement, each beam corresponds to one resource. Therefore, an index of the resource uniquely identifies the beam corresponding to the resource.

The network device generates different beams that point to different transmission directions. During downlink data transmission, in response to sending data to the terminal device by using a specific beam, the network device notifies the terminal device of information about a transmission beam used by the network device. In this way, the terminal device receives, by using a reception beam corresponding to the transmission beam, the data sent by the network device.

2. Resource

During beam measurement, an index of the resource uniquely identifies a beam corresponding to the resource. The resource is an uplink signal resource, or is a downlink signal resource. An uplink signal includes but is not limited to an SRS, a PUCCH, a PUSCH, and the like. A downlink signal includes but is not limited to a CSI-RS, a TRS, a PDCCH, and a PDSCH.

The resource is configured by using an RRC message. In a configuration structure, one resource is one data structure, and includes a related parameter of an uplink signal/a downlink signal corresponding to the resource, for example, a type of the uplink/downlink signal, a resource element that carries the uplink/downlink signal, sending time and a sending periodicity of the uplink/downlink signal, and a quantity of ports used to send the uplink/downlink signal. A resource of each uplink/downlink signal has a unique index, to identify the resource of the uplink/downlink signal. The index of the resource is also referred to as an identifier of the resource. This is not limited in at least one embodiment.

3. TA and TAG

Refer to FIG. 1. During uplink transmission, a signal uses a specific transmission time to arrive at a station of a network device from a terminal. To implement uplink synchronization, to be specific, to enable a time point at which an uplink signal arrives at the station to be exactly start time of an uplink slot (slot), the terminal sends the uplink signal specific time earlier than the start time of the uplink slot. A timing advance is exactly equal to transmission time of the uplink signal, and the timing advance is the TA. For terminals in a same cell, each terminal sends, based on a TA of the terminal, an uplink signal to a same station corresponding to the cell, to ensure that uplink signals of a plurality of terminals arrives at the station at the start time of the uplink slot, that is, to ensure that all the terminals implement uplink synchronization. In this way, the station successfully receives the uplink signal of each terminal.

Figure 2:
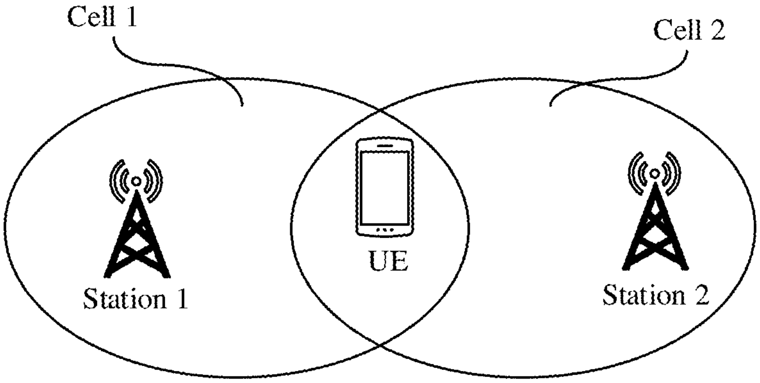
FIG. 2 is a schematic diagram 1 of a location relationship between UE and a cell.

In response to cells in which the terminals are located being different, TAs used by the terminals are also different. Therefore, each corresponding TA is determined based on the TAG. The TAG is a configuration information element, and includes a TA-related parameter. For a terminal in a cell, a network side configures one TAG of the cell for the terminal, and the TAG corresponds to one TA. In this way, the terminal determines the corresponding TA based on the TAG, and performs uplink transmission with a station in the cell, to implement uplink synchronization. For example, as shown in FIG. 2, UE 1 is located in both a cell 1 and a cell 2, and the network side configures, for the UE 1, TAG 1 {TA 1} corresponding to the cell 1 and TAG 2 {TA 2} corresponding to the cell 2. In this way, the UE 1 sends, by using TAG 1 {TA 1}, an uplink signal to a station 1 corresponding to the cell 1, to implement uplink synchronization with the station 1. Similarly, the UE 1 also sends, by using TAG 2 {TA 2}, an uplink signal to a station 2 corresponding to the cell 2, to implement uplink synchronization with the station 2. TAGs configured for different terminals in a same cell are the same, but TA parameters corresponding to the TAG are different. In other words, TA indexes are the same, but TA values corresponding to the same TA index are different. For example, as shown in FIG. 2, both the UE 1 and UE 2 are in the cell 1, and the network side still configures, for the UE 2, TAG 1 {TA 1} corresponding to the cell 1. In this case, TA indexes of the UE 1 and the UE 2 are the same (where both indexes are 1), but a TA value corresponding to the TA index of the UE 1 is different from a TA value corresponding to the TA index of the UE 2, in other words, a TA value corresponding to the TAG 1 of the UE 1 is different from a TA value corresponding to the TAG 1 of the UE 2.

For one terminal, the network side configures, for the terminal, one TAG and one TA offset (offset) that correspond to a cell in which the terminal is located. The TA offset is applicable to all terminals in the cell, in other words, TA offsets of all the terminals in the cell are the same. On this basis, the network side configures, for the terminal, one initial TA value corresponding to the TAG. The initial TA value corresponds to a distance of the terminal, and the distance is a distance between the terminal and a station corresponding to the cell. In other words, the initial TA value configured by the network side for the terminal varies with the distance between the terminal and the station. In this way, the terminal determines, based on the initial TA value and the TA offset that correspond to the TAG, one TA value corresponding to the TAG. For example, the TA value=the TA offset+the initial TA value. Then, as the terminal moves, the distance between the terminal and the station also changes accordingly, and the network side correspondingly updates the TA value based on the change of the distance, to maintain uplink synchronization.

Unless otherwise specified, the TA mentioned in at least one embodiment indicates a TA index. For example, the TA 1 indicates that a TA index is 1. Alternatively, the TA mentioned in at least one embodiment indicates a TA value corresponding to a TA index. For another example, the TA 1 indicates a TA value corresponding to a TA index 1. Understandings of the two cases is replaced with each other. However, in response to a plurality of TAs mentioned in at least one embodiment being understood as TA values, the plurality of TAs do not indicate a plurality of TA values corresponding to one TA index, but indicate TA values respectively corresponding to a plurality of TA indexes. In addition, in at least one embodiment, one TA index usually corresponds only to one TA value. Unless otherwise specified, the TAG mentioned in at least one embodiment usually indicates an index or a TAG ID of the TAG. For example, the TAG 1 indicates a TAG whose index is 1. In addition, for ease of description, concepts of both the "network device" and the "station" are mentioned in at least one embodiment. The network device is understood as a general term of all devices (including stations) on the network side. For example, a plurality of stations is collectively referred to as a network device. The station is one transmission node having a specific physical location. In other words, the network device conceptually includes the station. Unless otherwise specified, the signal mentioned in at least one embodiment, for example, the uplink signal, the downlink signal, or a first signal, is a specific signal, for example, the SRS or the CSI-RS, or is a specific channel, for example, the PUSCH or the PUCCH. In addition, the signal mentioned in at least one embodiment is also understood as a resource. For example, the spatial relationship reference signal is understood as a spatial relationship reference signal resource, a beam reference signal is understood as a beam reference signal resource, and a path loss reference signal is understood as a path loss reference signal resource. The signal and the resource are replaced with each other.

Figure 3:
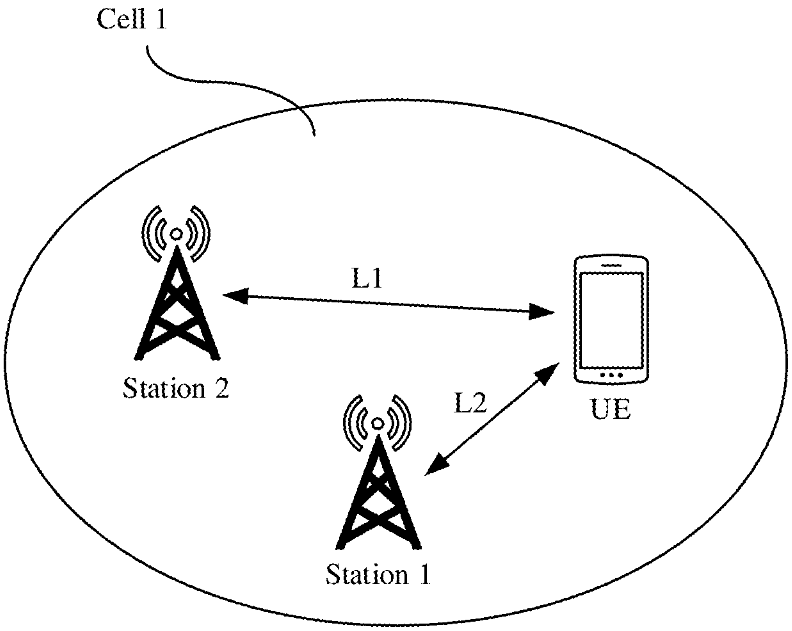
FIG. 3 is a schematic diagram 2 of a location relationship between UE and a cell.

In response to one cell of the network device corresponding to one station, the terminal performs uplink transmission with the station by using one TAG and one TA that correspond to the cell, to implement uplink synchronization. However, in response to one cell of the network device corresponding to a plurality of stations, because distances between the terminal and the plurality of stations are usually unequal, in response to the terminal separately performing uplink transmission with the plurality of stations by using one TAG and one TA that correspond to the cell, the terminal synchronizing with the plurality of stations is difficult. Consequently, a performance loss of uplink transmission is caused. For example, as shown in FIG. 3, a cell 1 includes a station 1 and a station 2. A distance between UE 1 and the station 1 and a distance between the UE 1 and the station 2 are respectively L1 and L2. L1 is less than L2. A network side configures, for the UE 1, TAG 1 {TA 1} corresponding to the cell 1. In this case, in response to the UE 1 implementing uplink synchronization by performing uplink transmission with the station 1 by using TAG 1 {TA 1}, the UE 1 cannot implement uplink synchronization by performing uplink transmission with the station 2 by using TAG 1 {TA 1}. A time point at which an uplink signal arrives at the station 2 is earlier than start time of an uplink slot of the station 2. Consequently, a performance loss of uplink transmission between the UE 1 and the station 2 is caused. Similarly, in response to the UE 1 implementing uplink synchronization by performing uplink transmission with the station 2 by using TAG 1 {TA 1}, the UE 1 cannot implement uplink synchronization by performing uplink transmission with the station 1 by using TAG 1 {TA 1}. A time point at which an uplink signal arrives at the station 1 is later than start time of an uplink slot of the station 1. Consequently, a performance loss of uplink transmission between the UE 1 and the station 1 is caused.

For the foregoing technical problem, embodiments described herein provide the following technical solutions.

The technical solutions in at least one embodiment is applied to various communication systems, for example, a wireless fidelity (Wi-Fi) system, a vehicle to everything (V2X) communication system, a device-to-device (D2D) communication system, an internet of vehicles communication system, a 4th generation (4G) mobile communication system such as a long term evolution (LTE) system, a 5G mobile communication system such as a new radio (NR) system, and a future communication system such as a 6th generation (6G) mobile communication system.

All aspects, embodiments, or features are presented in at least one embodiment by describing a system that includes a plurality of devices, components, modules, and the like. Each system includes another device, component, module, and the like, and/or does not include all devices, components, modules, and the like discussed with reference to the accompanying drawings. In addition, a combination of these solutions is used.

In addition, in at least one embodiment, terms such as "example" and "for example" are used to represent giving an example, an illustration, or a description. Any embodiment or design solution described as an "example" in at least one embodiment should not be explained as being more preferable or having more advantages than another embodiment or design solution. Exactly, the term "example" is used to present a concept in a specific manner.

In at least one embodiment, terms "information (information)", "signal (signal)", "message (message)", "channel (channel)", and "signaling (signaling)" are sometimes interchangeably used. Meanings expressed by the terms are consistent in response to differences of the terms not being emphasized. The terms "of (of)", "corresponding (corresponding, relevant)", and "corresponding (corresponding)" is interchangeably used sometimes. Expressed meanings are consistent in response to differences not being emphasized. Unless otherwise specified, "/" indicates "or".

A network architecture and a service scenario described in at least one embodiment are intended to describe the technical solutions in at least one embodiment more clearly, and do not constitute a limitation on the technical solutions provided in at least one embodiment. A person of ordinary skill in the art knows that: With the evolution of the network architecture and the emergence of new service scenarios, the technical solutions provided in at least one embodiment are also applicable to similar technical problems.

Figure 4:
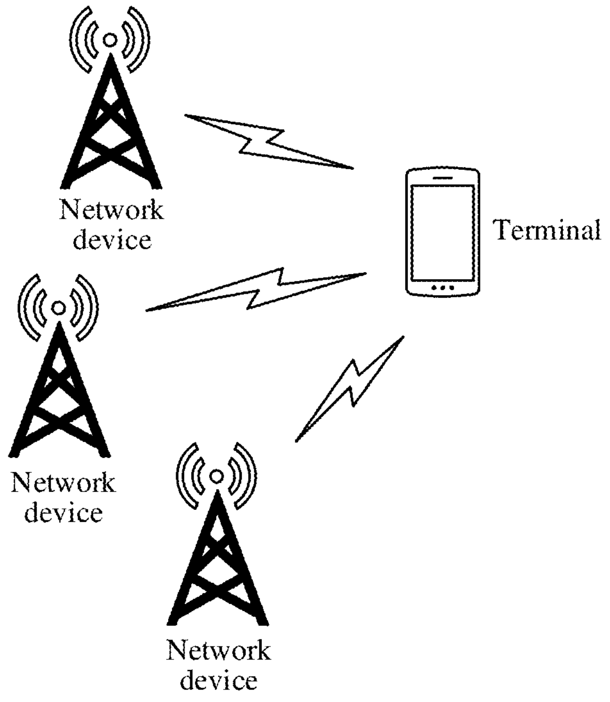
FIG. 4 is a schematic diagram 1 of an architecture of a communication system according to at least one embodiment.

For ease of understanding embodiments described herein, a communication system shown in FIG. 4 is first used as an example to describe in detail a communication system to which at least one embodiment is applicable. For example, FIG. 4 is a schematic diagram of an architecture of a communication system to which a communication method according to at least one embodiment is applicable.

As shown in FIG. 4, the communication system includes a terminal and a network device.

The terminal is a terminal that accesses the communication system and that has a wireless transceiver function, or the terminal is a chip or a chip system that is disposed in the terminal. The terminal is also referred to as user equipment (UE), an access terminal, a subscriber unit (subscriber unit), a subscriber station, or a mobile station (MS), a remote station, a remote terminal, a mobile device, a user terminal, a terminal, a wireless communication device, a user agent, or a user apparatus. The terminal in at least one embodiment is a mobile phone (mobile phone), a cellular phone (cellular phone), a smartphone (smartphone), a pad (Pad), a wireless data card, a personal digital assistant (PDA), a wireless modem (modem), a handset (handset), a laptop computer (laptop computer), a machine type communication (MTC) terminal, a computer having a wireless transceiver function, a virtual reality (VR) terminal, an augmented reality (AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), an in-vehicle terminal, an RSU having a terminal function, or the like. The terminal in at least one embodiment is alternatively an in-vehicle module, an in-vehicle assembly, an in-vehicle component, an in-vehicle chip, or an in-vehicle unit that is built in a vehicle as one or more components or units.

There is a plurality of network devices, and the plurality of network devices are devices that are located on a network side of the communication system and that have a wireless transceiver function, or the plurality of network devices are chips or chip systems that is disposed in the devices. The network device includes: a gNB in a 5G system such as an NR system, one or a group of (including a plurality of antenna panels) antenna panels of a base station in the 5G system, a network node forming a gNB, a transmission point (transmission and reception point, TRP, or transmission point, TP), or a transmission measurement function (TMF), for example, a baseband unit (BBU), a central unit (CU), a distributed unit (DU), or a roadside unit (RSU) having a base station function, a wired access gateway, or the like. In addition, in systems using different radio access technologies, names of the network device vary, for example, a base transceiver station (BTS) in a global system for mobile communications (GSM) or a code division multiple access (CDMA) network, an NB (NodeB) in a wideband code division multiple access (WCDMA) network, or an eNB or an eNodeB (evolved NodeB) in LTE. Alternatively, the network device is a radio controller in a cloud radio access network (CRAN) scenario. In addition, the network device also includes an access point (AP) in a Wi-Fi system, a wireless relay node, a wireless backhaul node, and a macro base station, a micro base station (also referred to as a small cell), a relay station, an access point, a wearable device, an in-vehicle device, and the like that are in various forms.

Figure 5:
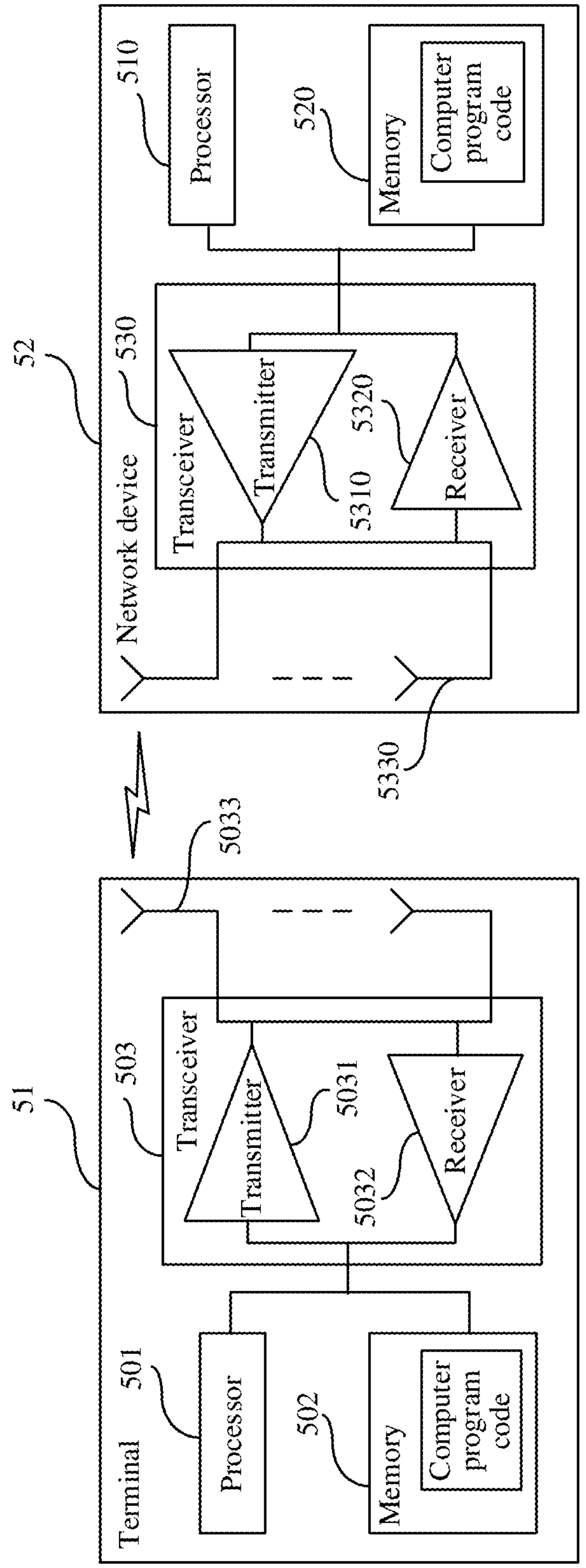
FIG. 5 is a schematic diagram 2 of an architecture of a communication system according to at least one embodiment.

Communication between the network device and the terminal in the communication system shown in FIG. 4 is alternatively represented in another form. As shown in FIG. 5, a terminal 51 includes a processor 501, a memory 502, and a transceiver 503. The transceiver 503 includes a transmitter 5031, a receiver 5032, and an antenna 5033. A network device 52 includes a processor 510, a memory 520, and a transceiver 530. The transceiver 530 includes a transmitter 5310, a receiver 5320, and an antenna 5330. The receiver 5032 is configured to receive a downlink signal through the antenna 5033, and the transmitter 5031 is configured to send an uplink signal to the network device 52 through the antenna 5033. The transmitter 5310 is configured to send a downlink signal to the terminal 51 through the antenna 5330, and the receiver 5320 is configured to receive, through the antenna 5330, an uplink signal sent by the terminal device 51.

Figure 6:
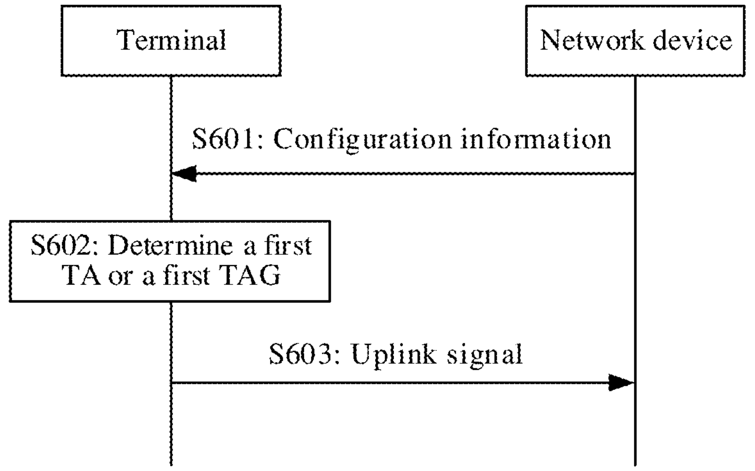
FIG. 6 is a schematic flowchart 1 of a communication method according to at least one embodiment.
Figure 7:
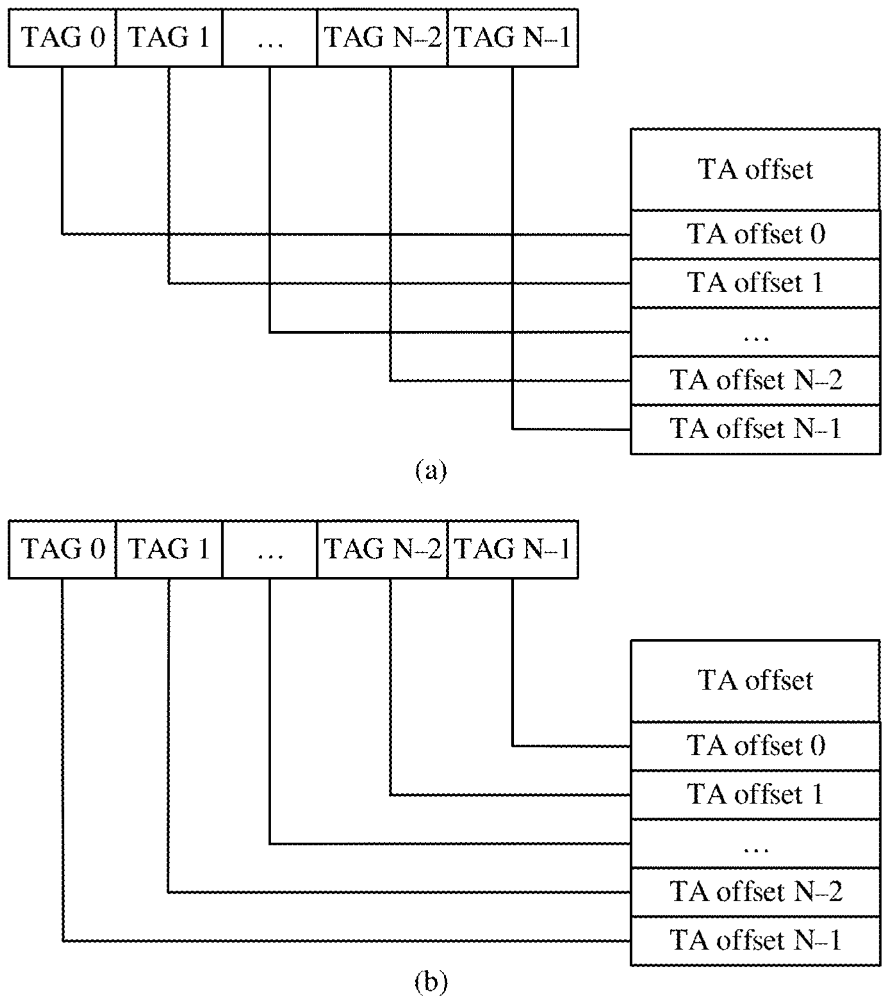
FIG. 7 is a schematic diagram of a correspondence between a TA offset and a TAG in a communication method according to at least one embodiment.
Figure 8:
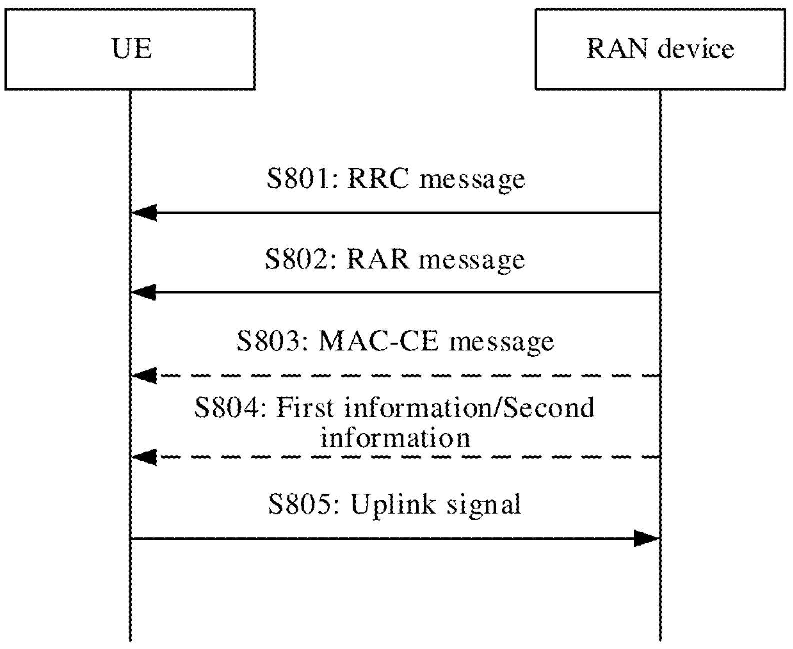
FIG. 8 is a schematic flowchart 2 of a communication method according to at least one embodiment.

The following describes in detail a communication method provided in at least one embodiment with reference to FIG. 6 to FIG. 8.

For example, FIG. 6 is a schematic flowchart 1 of a communication method according to at least one embodiment. The communication method is applicable to communication between any two nodes, for example, the terminal and the network device, in the network architecture shown in FIG. 4. As shown in FIG. 6, the communication method includes S601, S602, and S603.

S601: The network device sends configuration information to the terminal. Correspondingly, the terminal receives the configuration information from the network device.

The configuration information is carried in an RRC message or any other message. The configuration information includes one or more of the following: a plurality of TAGs corresponding to one cell of the network device or a plurality of TA offsets corresponding to one cell of the network device. Each of the plurality of TA offsets corresponds to at least a part of the plurality of TAGs. In other words, the TA offset and the TAG is in one-to-one correspondence, or the TA offset and the TAG is in one-to-many correspondence.

Specifically, the configuration information includes N TAGs and N TA offsets, the N TAGs and the N TA offsets is in one-to-one correspondence, and N is an integer greater than 1. In a correspondence manner, the N TAGs correspond to the N TA offsets in sequence. To be specific, a TA offset whose TA index is the $i^{th}$ largest in the N TA offsets corresponds to a TAG whose index is the $i^{th}$ largest in the N TAGs, or a TA offset whose TA index is the $i^{th}$ smallest in the N TA offsets corresponds to a TAG whose index is the $i^{th}$ smallest in the N TAGs. For example, as shown in (a) in FIG. 7, a TA offset 0 corresponds to a TAG 0, and a TA offset 1 corresponds to a TAG 1. By analogy, a TA offset N-2 corresponds to a TAG N-2, and a TA offset N-1 corresponds to a TAG N-1. In another correspondence manner, the N TAGs correspond to the N TA offsets in a reverse sequence. To be specific, a TA offset whose TA index is the $i^{th}$ smallest in the N TA offsets corresponds to a TAG whose index is the $i^{th}$ largest in the N TAGs, or a TA offset whose TA index is the $i^{th}$ largest in the N TA offsets corresponds to a TAG whose index is the $i^{th}$ smallest in the N TAGs. For example, as shown in (b) in FIG. 7, a TA offset 0 corresponds to a TAG N-1, and a TA offset 1 corresponds to a TAG N-2. By analogy, a TA offset N-2 corresponds to a TAG 1, and a TA offset N-1 corresponds to a TAG 0. In addition, an index of a TAG or a TA offset is numbered from 0, or is numbered from any other number, for example, from 1. This is not limited herein. In still another correspondence manner, the N TAGs correspond to the N TA offsets in respective configuration sequences. For example, an $i^{th}$ TAG corresponds to an $i^{th}$ TA offset, or a TAG whose index is the $i^{th}$ smallest corresponds to the $i^{th}$ TA offset. This is not limited herein.

Alternatively, the configuration information includes M TAGs and N TA offsets, an $i^{th}$ TA offset in the N TA offsets corresponds to m TAGs in the M TAGs, N and M are integers greater than 1, i is an integer of any value from 1 to N, and m is a positive integer. For example, a TA offset 0 corresponds to {TAG 0, TAG 1, TAG 2}, a TA offset 1 corresponds to {TAG 1, TAG 2}, a TA offset 2 corresponds to {TAG 2, TAG 3}, and the like. For another example, a TA offset 0 corresponds to {TAG 0}, a TA offset 1 corresponds to {TAG 1, TAG 2}, a TA offset 2 corresponds to {TAG 2, TAG 3}, and the like.

In the foregoing configuration information, the TAG is a global index (or the index of the TAG is a global index); or the TAG is a local index (or the index of the TAG is a local index). The global index indicates that the TAG is a TAG in all TAGs corresponding to all cells. All the cells are all cells configured by the network device for the terminal. The local index indicates that the TAG is a TAG in a plurality of TAGs corresponding to a specific cell. The specific cell is a cell that sends the configuration information. In addition, the correspondence between the TAG and the TA offset is not limited to the correspondences described above. Alternatively, one TAG corresponds to a plurality of TA offsets. This is not limited in at least one embodiment. Optionally, the terminal sends a random access request (RAR) message to the network device. The random access request message requests an initial TA value corresponding to a specific TAG. The network device sends a RAR message to the terminal. The random access response message includes the initial TA value of the specific TAG. Correspondingly, the terminal receives the RAR message from the network device.

The RAR message includes related information of a TAG in the plurality of TAGs, for example, an index of the TAG and one initial TA value corresponding to the TAG. A first TAG is used as an example. The RAR message includes related information of the first TAG, for example, an index of the first TAG, and an initial TA value corresponding to the first TAG, for example, a first initial TA value. An example of a frame format of the RAR message is shown in the following Table 1.

TABLE 1

| 1 bit | 1 bit | 1 bit | 1 bit | 1 bit | 1 bit | 1 bit | 1 bit |
|---|---|---|---|---|---|---|---|
| R | Timing advance command | | | | | | |
| Timing advance command | | | | | UL Grant | | |
| UL Grant | | | | | | | |
| UL Grant | | | | | | | |
| UL Grant | | | | | | | |
| Temporary C-RNTI | | | | | | | |
| Temporary C-RNTI | | | | | | | |

The first initial TA value is indicated by some fields in the RAR message, for example, a timing advance command (timing advance command) field in Table 1. The timing advance command field has a plurality of bits (bits), for example, 12 bits, so that the plurality of bits indicate various values of the first initial TA value. The first TAG is indicated by some other fields in the RAR message, for example, a reserved field (an R field) in Table 1, so that the terminal determines, based on the reserved field in the RAR message, that the initial TA value in the RAR message is the first initial TA value corresponding to the first TAG. The reserved field is one bit, so that a value 0 or 1 of the bit correspondingly indicates two TAGs. For example, the value 0 of the bit indicates the first TAG, and the value 1 of the bit indicates another TAG, for example, a second TAG. Alternatively, the value 1 of the bit indicates the first TAG, and the value 0 of the bit indicates a second TAG. In response to more than two TAGs being indicated, the reserved field and another field is used for joint indication. For example, redundant bits in the timing advance command field are used, and these redundant bits and the reserved field jointly indicate more than two TAGs. The first TAG is alternatively indicated by any other field in the RAR message. This is not limited in at least one embodiment. For example, the first TAG is alternatively indicated by using some or all bits of an existing field in the random access response message. Specifically, some or all bits of a temporary C-RNTI field in the random access response message is used as the foregoing field, to be specific, indicates whether a TA included in the random access response message is a TA of a first cell. Optionally, the some or all bits of the currently existing field in the random access response message indicate the first TAG only in response to a first condition being met. The first condition at least includes: A random access preamble corresponding to the random access response message is a contention-free random access preamble. In the RAR message, the first TAG is a local index (or the index of the first TAG is a local index); or the first TAG is a global index (or the index of the first TAG is a global index). The global index indicates that the first TAG is a TAG in all TAGs corresponding to all cells. All the cells are all serving cells configured by the network device for the terminal. The local index indicates that the first TAG is a TAG in a plurality of TAGs corresponding to a specific cell. The specific cell is a cell that sends the RAR message. The first row of the foregoing table only indicates a correspondence manner of bits, and is not content of the RAR message. In other words, the content of the RAR message starts from the second row of the foregoing table.

Alternatively, the RAR message includes only the timing advance command field, and does not include a TAG indication field. In this case, a TAG corresponding to an initial TA value indicated by the timing advance command field in the RAR message is determined by using an SSB corresponding to the RAR message.

In an implementation, each SSB in one cell is associated with one TAG, or SSBs in one cell are classified into a plurality of groups, and each SSB group is associated with one TAG. The SSB group is indicated by the network device to the terminal. For example, the SSB group is sent to the terminal by using an RRC configuration message. An association relationship between the SSB and the TAG is indicated by the network device to the terminal. For example, the association relationship between the SSB and the TAG is sent to the terminal by using the RRC configuration message. An association relationship between the SSB group and the TAG is indicated by the network device to the terminal. For example, the association relationship between the SSB group and the TAG is sent to the terminal by using the RRC configuration message. Alternatively, the association relationship is a rule specified in a protocol. For example, an $i^{th}$ SSB group is associated with an $i^{th}$ TAG, or the $i^{th}$ SSB group is associated with a TAG whose index is the $i^{th}$ smallest or the $i^{th}$ largest. The terminal determines, based on the SSB corresponding to the RAR message, the TAG corresponding to the initial TA value indicated in the RAR message. For example, the terminal determines the SSB corresponding to the RAR message, and then determines a TAG associated with the SSB, or determine a TAG associated with an SSB group to which the SSB belongs. The TAG is the TAG corresponding to the initial TA value indicated in the RAR message. The SSB corresponding to the RAR message is specifically an SSB associated with the random access request message corresponding to the RAR message. Each random access request message is associated with one SSB. The SSB associated with the random access request message is indicated by using a DCI message. For example, the network device sends the DCI message to the terminal. The DCI message indicates the terminal to send the random access request message to the network device, and the DCI message includes information about the SSB associated with the random access request message.

From the foregoing descriptions of the RAR message, one RAR message carries one initial TA value corresponding to one TAG. In response to the network device expecting to configure a plurality of initial TA values for the terminal, the network device sends a plurality of RAR messages to the terminal. A sequence of sending, by the network device, the plurality of RAR messages to the terminal and sending, by the network device, the configuration information to the terminal, that is, S601, is not limited. The network device sends the plurality of RAR messages to the terminal before S601, sends the plurality of RAR messages to the terminal after S601, or sends some RAR messages to the terminal before S601, and send the other RAR messages to the terminal after S601. In response to the network device sending one RAR message to the terminal before S601, because the terminal has not learned of a corresponding TAG by using the configuration information, the terminal cannot understand a meaning of a TAG in the RAR message, namely, a meaning of the reserved field. Therefore, the terminal considers by default that an initial TA value in the RAR message is a TAG, for example, the first initial TA value corresponding to the first TAG. In other words, regardless of which initial TA value is included in the RAR message by the network device, the terminal considers the initial TA value as the first initial TA value corresponding to the first TAG. In this case, to avoid a configuration error, the network device should be aligned with the terminal. To be specific, the network device should carry the default initial TA value of the terminal in the RAR message. In other words, in this case, the terminal device considers by default that a value of the field indicating the TAG is 0. Alternatively, in this case, the terminal device ignores a value of the field indicating the TAG. In addition, in response to the network device sending the plurality of RAR messages to the terminal before S601, the terminal considers, by default and based on a sequence of receiving the plurality of RAR messages, an initial TA value in each RAR message as a corresponding initial TA value. For example, for the $1^{st}$ received RAR message, the terminal considers by default that an initial TA value in the RAR message is the first initial TA value corresponding to the first TAG, for the $2^{nd}$ received RAR message, the terminal considers by default that an initial TA value in the RAR message is a second initial TA value corresponding to the second TAG, and so on. In this case, to avoid a configuration error, the network device should sequentially carry the corresponding initial TA values in the RAR messages based on an understanding sequence of the terminal. In addition, before sending the RAR message to the terminal, the network device further receives the random access request (random access request) message from the terminal.

For the terminal, the terminal determines, based on one initial TA value corresponding to each TAG and one TA offset corresponding to each TAG, one TA corresponding to each TAG, for example, a value of the TA, in other words, determine values of a plurality of TAs corresponding to one cell of the network device. For example, the terminal determines, based on the initial TA value corresponding to the first TAG, for example, the first initial TA value, and a TA offset corresponding to the first TAG, for example, a first TA offset, one TA corresponding to the first TAG, for example, a first TA or another TA. For example, assuming that TAG 0 {TA offset 0} and TAG 0 {initial TA value 0} are configured, the terminal determines that TAG 0 {TA value of TA 0}=TAG 0 {TA offset 0+initial TA value 0}; and assuming that TAG 1 {TA offset 1} and TAG 1 {initial TA value 1} are configured, the terminal determines that TAG 1 {TA value of TA 1}=TAG 1 {TA offset 1+initial TA value 1}. The configuration information including one initial TA value corresponding to each of the plurality of TAGs is merely an example. Alternatively, the configuration information does not include these initial TA values. In other words, one initial TA value corresponding to each of the plurality of TAGs is preconfigured locally on the terminal. This is not limited in at least one embodiment. In addition, for specific principles of the initial TA value and the TA offset, refer to related descriptions in the foregoing "5. TA and TAG". Details are not described again.

The network device configures, for the terminal, the TA offset and the initial TA value that correspond to the TAG, so that the terminal determines a TA corresponding to each TAG. In this way, even in response to the network device indicating only a TAG, the terminal determines a corresponding TA or TAG based on the TAG, so that uplink synchronization is implemented. In addition, for descriptions of determining, by the terminal, the corresponding TA or TAG, refer to related descriptions in the following S602.

S602: The terminal determines the first TA or the first TAG.

The first TA is a TA corresponding to uplink signal transmission, and the first TAG is a TAG corresponding to uplink signal transmission.

S603: The terminal sends a corresponding uplink signal to the network device based on the first TA or the first TAG. Correspondingly, the network device receives the uplink signal from the terminal.

The terminal determines a corresponding TA value based on the first TA or the first TAG to send the corresponding uplink signal to the network device based on the TA value, so that the network device receives the uplink signal at start time of an uplink slot. In addition, in response to one TAG, for example, the first TAG, corresponds to a plurality of TAs, a TA used for uplink transmission is one of the plurality of TAs. A specific TA that is in the TAs and that is used for uplink transmission is determined based on other information corresponding to uplink transmission. The other information includes one or more of the following: a terminal transmission beam, a terminal antenna panel, a beam reference signal, a path loss reference signal, a TA reference signal, a TRP index, a CORESET group index, a beam failure detection resource group index, a new beam identification resource group index, or the like. This is not limited in at least one embodiment.

The following describes specific implementation of S602.

The first TA is one of the plurality of TAs corresponding to one cell of the network device, and the first TAG is one of the plurality of TAGs corresponding to one cell of the network device. The first TA or the first TAG indicates uplink transmission of the terminal. To be specific, the terminal sends the corresponding uplink signal to the network device based on the first TA or the first TAG. The uplink signal includes one or more of the following: an SRS, a PUSCH, or a PUCCH. The SRS is one or more of the following: a codebook (codebook)-type SRS, a non-codebook (non-codebook)-type SRS, a beam management (beam management)-type SRS, an antenna switching (antenna switching)-type SRS, a periodic SRS, a semi-persistent SRS, or an aperiodic SRS. In addition, the SRS is alternatively a combination of the foregoing plurality of types. For example, the SRS is both the codebook-type SRS and the periodic SRS, that is, a periodic SRS in a codebook type. For another example, the SRS is both the non-codebook-type SRS and the semi-persistent SRS, that is, a semi-persistent SRS in a non-codebook type. For still another example, the SRS is both the beam management-type SRS and the aperiodic SRS, that is, an aperiodic SRS in a beam management type. The terminal determines the first TA or the first TAG in an explicit indication manner or an implicit indication manner.

Manner 1: Explicit Indication

The explicit indication indicates that the first TA or the first TAG is determined based on first information, and the first information indicates the first TA or the first TAG corresponding to the uplink signal. For example, the first information indicates the index of the first TAG. In other words, the network device indicates a currently used TA or TAG by using the first information based on an actual situation, to implement more flexible TA or TAG selection. A selected TA or TAG better matches an uplink transmission distance of the terminal, and uplink transmission is more stable. The first information is carried in one or more of the following: an RRC message, a MAC-CE message, a DCI message, a spatial relationship, a TCI state, a power control parameter set, or QCL information (QCL-info). The following provides specific descriptions with reference to the uplink signal.

(A) The uplink signal is the SRS, and the first information is carried in one or more of the following: the RRC message, the MAC-CE message, or the DCI message.

The first information is carried in the RRC message. The first information corresponds to an SRS resource set (resource set) in the RRC message. For example, the network device configures the corresponding first TA or first TAG, that is, configure the first information, for the SRS resource set in the RRC message, to indicate that all SRSs corresponding to the SRS resource set need to be sent by using the first TA or the first TAG indicated by the first information. For example, TA 1 {SRS 1, SRS 2, SRS 3} or TAG 1 {SRS 1, SRS 2, SRS 3} is configured, to indicate that the SRS 1, the SRS 2, and the SRS 3 all need to be sent by using the TA 1 or the TAG 1. Alternatively, the first information corresponds to an SRS resource (resource) in the RRC message. For example, the network device configures the corresponding first TA or first TAG for the SRS resource in the RRC message, to indicate that an SRS corresponding to the SRS resource is sent by using the first TA or the first TAG indicated by the first information. For example, TA 1 {SRS 1} or TAG 1 {SRS 1} is configured, to indicate that the SRS 1 is sent by using the TA 1 or the TAG 1. In this case, to indicate that a plurality of SRSs are sent by using a same TA or TAG, the network device configures the same TA or TAG, for example, configure the first TA or the first TAG, for SRS resources of the plurality of SRSs. For example, TAG 1 {SRS 1}, TAG 1 {SRS 2}, and TAG 1 {SRS 3} are configured, to indicate that the SRS 1, the SRS 2, and the SRS 3 all need to be sent by using the TAG 1. Certainly, the network device alternatively configures different TAs or TAGs for a plurality of SRS resources of the plurality of SRSs respectively. This is not limited herein. The network device uses different configuration granularities to indicate the TA or the TAG corresponding to the SRS. For example, the TA or the TAG corresponding to the SRS is more conveniently indicated by using a configuration granularity of the SRS resource set, and the TA or the TAG corresponding to the SRS is more flexibly indicated by using a configuration granularity of the SRS resource.

The first information is carried in the MAC-CE message, and the MAC-CE message is a MAC-CE message (denoted as a MAC-CE message 1) used to activate a spatial relationship of the SRS. In other words, the MAC-CE message 1 indicates a transmission beam of the SRS. An example of a frame format of the MAC-CE message 1 is shown in the following Table 2.

TABLE 2

| 1 bit | 1 bit | 1 bit | 1 bit | 1 bit | 1 bit | 1 bit | 1 bit |
|---|---|---|---|---|---|---|---|
| A/D | SRS Resource Set's Cell ID | | | | SRS Resource Set's BWP ID | | |
| R1 | R2 | C | SUL | SP SRS Resource Set ID | | | |
| F0 | Resource ID 0 | | | | | | |
| . . . | | | | | | | |
| FM-1 | Resource ID M-1 | | | | | | |
| R | Resource Serving Cell ID 0 | | | | Resource Set's BWP ID 0 | | |
| . . . | | | | | | | |
| R | Resource Serving Cell ID M-1 | | | | Resource Set's BWP ID M-1 | | |

As shown in Table 2, the first information is some fields in the MAC-CE message 1, for example, an R1 field and/or an R2 field. In some indication manners, the first TA or the first TAG is indicated by using one field or a single bit, for example, the R1 field or the R2 field. For example, one of two TAGs of a specific cell is indicated by using the R1 field. Alternatively, one of two TAGs of a specific cell is indicated by using the R2 field. In some other indication manners, the first TA or the first TAG is indicated by using a plurality of fields or a plurality of bits. For example, two bits formed by the R1 field and the R2 field indicate one TAG, for example, indicate one TAG in TAGs corresponding to a specific cell, or one TAG in all TAGs corresponding to all cells. The specific cell is specifically a cell that sends the MAC-CE message 1, a cell indicated in the MAC-CE message 1, for example, a cell indicated by an SRS Resource Set's Cell ID field, or a cell in which the terminal is located. In addition to the foregoing MAC-CE message 1, another MAC-CE message indicates the TA or the TAG. A specific method is the same as the foregoing described method. To be specific, one or more bits indicate one of a plurality of TAGs of a specific cell, or one or more bits indicate one of a plurality of TAGs corresponding to all cells. The specific cell is a cell that sends the MAC-CE message 1, or is another cell, for example, a cell indicated in the MAC-CE message 1. The first row of the foregoing table only indicates a correspondence manner of bits, and is not content of the MAC-CE message 1. In other words, the content of the MAC-CE message 1 starts from the second row of the foregoing table.

The first information is carried in the DCI message, for example, is one DCI field in the DCI message, for example, a first DCI field. In the first DCI field, the first TAG is a global index, or is a local index. The global index indicates that the first TAG is a TAG in all TAGs corresponding to all cells. All the cells are all cells configured by the network device for the terminal. The local index indicates that the first TAG is a TAG in a plurality of TAGs corresponding to a specific cell. The specific cell is a cell that sends the DCI message, that is, a local cell, or is another cell, to implement cross-cell scheduling. The another cell is specifically indicated by using one field in the DCI message, for example, a carrier ID, or any other field. This is not limited in at least one embodiment. In addition, an indication principle of the first DCI field is similar to an indication principle of the MAC-CE message 1, and reference is made for understanding. Details are not described again.

In response to the uplink signal being the SRS, the first information is carried in the RRC message, the MAC-CE message or the DCI message is merely an example, and is not limited. The first information is further carried in the spatial relationship, the TCI state, the power control parameter set, or the QCL information. For specific implementation, refer to related descriptions in the following "(D)". Details are not described herein.

(B) The uplink signal is the PUCCH, and the first information is carried in one or more of the following: the RRC message or the MAC-CE message.

The first information is carried in the RRC message, and the first information corresponds to one group of PUCCHs in the RRC message, or corresponds to a PUCCH set. For example, the network device configures the corresponding first TA or first TAG, namely, the first information, for the group of PUCCHs in the RRC message, to indicate that the group of PUCCHs is sent by using the first TA or the first TAG indicated by the first information. For example, TA 1 {PUCCH 1, PUCCH 2, PUCCH 3} or TAG 1 {PUCCH 1, PUCCH 2, PUCCH 3} is configured, to indicate that the PUCCH 1, the PUCCH 2, and the PUCCH 3 all need to be sent by using the TA 1 or the TAG 1. Alternatively, the first information corresponds to a single PUCCH in the RRC message. For example, the network device configures the corresponding first TA or first TAG for each PUCCH in the RRC message, to indicate that the PUCCH is sent by using the first TA or the first TAG indicated by the first information. For example, TA 1 {PUCCH 1} or TAG 1 {PUCCH 1} is configured, to indicate that the PUCCH 1 is sent by using the TA 1 or the TAG 1. In this case, to indicate that a plurality of PUCCHs are sent by using a same TA or TAG, the network device configures the same TA or TAG, for example, configure the first TA or the first TAG, for the plurality of PUCCHs. For example, TAG 1 {PUCCH 1}, TAG 1 {PUCCH 2}, and TAG 1 {PUCCH 3} are configured, to indicate that the PUCCH 1, the PUCCH 2, and the PUCCH 3 all need to be sent by using the TAG 1. Certainly, the network device alternatively configures different TAs or TAGs for the plurality of PUCCHs respectively. This is not limited herein. The network device uses different configuration granularities to indicate the TA or the TAG corresponding to the PUCCH. For example, the TA or the TAG corresponding to the PUCCH is more conveniently indicated by using a configuration granularity of the PUCCH set, and the TA or the TAG corresponding to the PUCCH is more flexibly indicated by using a configuration granularity of the single PUCCH.

The first information is carried in the MAC-CE message, and the MAC-CE message is a MAC-CE message (denoted as a MAC-CE message 2) used to activate a spatial relationship of the PUCCH. In other words, the MAC-CE message 2 indicates a transmission beam of the PUCCH. An example of a frame format of the MAC-CE message 2 is shown in the following Table 3.

TABLE 3

| 1 bit | 1 bit | 1 bit | 1 bit | 1 bit | 1 bit | 1 bit | 1 bit |
|---|---|---|---|---|---|---|---|
| R3 | Serving Cell ID | | | | | BWP ID | |
| R4 | PUCCH Resource ID | | | | | | |
| S7 | S6 | S5 | S4 | S3 | S2 | S1 | S0 |

As shown in Table 3, the first information is some fields in the MAC-CE message 2, for example, an R3 field and/or an R4 field. In some indication manners, the first TA or the first TAG is indicated by using a single field or a single bit, for example, the R3 field or the R4 field. For example, one of two TAGs of a specific cell is indicated by using the R3 field. Alternatively, one of two TAGs of a specific cell is indicated by using the R4 field. In some other indication manners, the first TA or the first TAG is indicated by using a plurality of fields or a plurality of bits. For example, two bits formed by the R3 field and the R4 field indicate one TAG, for example, indicate one TAG in TAGs corresponding to a specific cell, or indicate one TAG in all TAGS corresponding to all cells. The specific cell is specifically a cell that sends the MAC-CE message 2, a cell indicated in the MAC-CE message 2, for example, a cell indicated by a Serving Cell ID field, or a cell in which the terminal is located. In addition to the foregoing MAC-CE message 2, another MAC-CE message indicates the TA or the TAG. A specific method is the same as the foregoing described method. To be specific, one or more bits indicate one of a plurality of TAGs of a specific cell, or one or more bits indicate one of a plurality of TAGs corresponding to all cells. The specific cell is a cell that sends the MAC-CE message 2, or is another cell, for example, a cell indicated in the MAC-CE message 2. The first row of the foregoing table only indicates a correspondence manner of bits, and is not content of the MAC-CE message 2. In other words, the content of the MAC-CE message 2 starts from the second row of the foregoing table.

In response to the uplink signal being the PUCCH, that the first information is carried in the RRC message or the MAC-CE message is merely an example, and does not constitute a limitation. The first information is further carried in the DCI message, the spatial relationship, the TCI state, the power control parameter set, or the QCL information. In response to the first information being carried in the DCI message, the PUCCH is a PUCCH corresponding to a PDSCH indicated by the DCI message or a PUCCH corresponding to downlink measurement. In other words, in response to the PDSCH being scheduled by using the DCI message, the DCI message indicates a TA or a TAG of a PUCCH for feeding back a HARQ result corresponding to the PDSCH. Alternatively, in response to the downlink measurement being triggered by using the DCI message, the DCI message indicates a TA or a TAG of a PUCCH for feeding back a measurement result corresponding to the downlink measurement.

For specific implementation of carrying the first information in the spatial relationship, the TCI state, or the QCL information, refer to related descriptions in the following "(D)". Details are not described herein.

(C) The uplink signal is the PUSCH, and the first information is carried in the DCI message.

The DCI message is a DCI message for scheduling the PUSCH. The first information is a DCI field in the DCI message, for example, a second DCI field. The second DCI field is one or more bits, and the one or more bits indicate the first TA or the first TAG. Similar to a first DCI field, in the second DCI field, the first TAG is a global index, or is a local index. The global index indicates that the first TAG is a TAG in all TAGs corresponding to all cells. All the cells are all cells configured by the network device for the terminal. The local index indicates that the first TAG is a TAG in a plurality of TAGs corresponding to a specific cell. The specific cell is a cell that sends the DCI message, that is, a local cell, or is another cell, to implement cross-cell scheduling. The another cell is specifically indicated by using one field in the DCI message, for example, a carrier ID, or any other field. This is not limited in at least one embodiment. In addition, an indication principle of the second DCI field is similar to an indication principle of the MAC-CE message 1 or the MAC-CE message 2, and reference is made for understanding. Details are not described again.

In response to the uplink signal being the PUSCH, that the first information is carried in the DCI message is merely an example, and does not constitute a limitation. The first information is further carried in the RRC message, the MAC-CE message, the spatial relationship, the TCI state, or the QCL information. For specific implementation of carrying the first information in the spatial relationship, the TCI state, or the QCL information, refer to related descriptions in the following "(D)". Details are not described herein.

(D) The uplink signal includes one or more of the following: the SRS, the PUSCH, or the PUCCH. The first information is carried in the spatial relationship, the TCI state, the power control parameter set, or the QCL information.

The spatial relationship, the TCI state, or the QCL information indicates a transmission beam of the uplink signal. In other words, the terminal sends the uplink signal by using the transmission beam indicated in the spatial relationship, the TCI state, or the QCL information. In this case, in response to the first information being carried in the spatial relationship, the TCI state, or the QCL information, the terminal sends the uplink signal by using the transmission beam and the first TA or the first TAG, so that the transmission beam and the first TA or the first TAG are indicated together. In this way, signaling overheads is reduced, and communication efficiency is improved. Specifically, the first information is a field in the spatial relationship, the TCI state, or the QCL information. The field includes a plurality of bits, so that the first TA or the first TAG is indicated by using a value of a single bit in the plurality of bits or a combination of values of the plurality of bits. The first TAG indicated by the plurality of bits is a global index, or is a local index. The global index indicates that the first TAG is a TAG in all TAGs corresponding to all cells. All the cells are all cells configured by the network device for the terminal. The local index indicates that the first TAG is a TAG in a plurality of TAGs corresponding to a specific cell. The specific cell is a cell that sends the spatial relationship, the TCI state, or the QCL information, that is, a local cell, or is another cell, to implement cross-cell scheduling. The another cell is specifically indicated by using the field in the spatial relationship, the TCI state, or the QCL information.

This is not limited in at least one embodiment. In addition, an indication principle of the plurality of bits is similar to an indication principle of the MAC-CE message 1 or the MAC-CE message 2, and reference is made for understanding. Details are not described again. For specific implementation of the spatial relationship, the TCI state, and the QCL information, refer to related descriptions in the following "(a) QCL information implementation" and "(b) Spatial relationship implementation". Details are not described herein.

The power control parameter set is a parameter set used to calculate a transmit power of the uplink signal, and includes a path loss reference resource and the like. The first information is carried in the power control parameter set, so that a power control parameter and the first TA or the first TAG is indicated, thereby reducing signaling overheads, and improving communication efficiency.

In the foregoing descriptions, the network device flexibly chooses to use the manner in which a single bit is used for indication or the manner in which a plurality of bits are used for indication. For example, in response to a quantity of TAs or TAGs being small, the manner in which a single bit is used for indication is used to flexibly indicate each TA or TAG. In response to a quantity of TAs or TAGs being large, the manner in which a plurality of bits are used for indication is used to indicate more TAs or TAGs. This is not limited in at least one embodiment. In addition, the first information does not only indicate a TA or a TAG corresponding to a cell of the network device, but also indicates a TA or a TAG corresponding to a cell of another network device, to implement cross-cell scheduling. For example, the network device includes a cell identifier of the another network device in a cell identifier field corresponding to the SRS resource set in the MAC-CE message 1, or in a serving cell identifier field in the MAC-CE message 2, to indicate that a terminal located in the cell of the another network device sends the uplink signal by using the corresponding TA or TAG.

Manner 2: Implicit Indication

The implicit indication indicates that the first TA or the first TAG is determined based on a first signal. For example, a TA or a TAG corresponding to the first signal is used as the first TA or the first TAG. The first signal is a spatial relationship reference signal of the uplink signal. In other words, the first TA or the first TAG is determined by using a reference signal for determining a spatial relationship. The spatial relationship is also understood as a transmission beam, a spatial filter, or the like. For details, refer to the foregoing descriptions. The first signal is an SSB, the spatial relationship reference signal, or a path loss reference signal corresponding to the uplink signal. In other words, the first TA or the first TAG is determined by using a reference signal for determining a path loss. Alternatively, the first signal is a reference signal specially used to determine a TA or a TAG, and the reference signal is referred to as a TA reference signal in at least one embodiment. The first signal includes one or more of the following: an SRS, an SSB, a CSI-RS, a TRS, a PDCCH, a PDSCH, a PUCCH, or a PUSCH. To determine the first TA or the first TAG by using the first signal, an association relationship is established between the first signal and the TA or the TAG. For example, an association relationship between the SSB or the SRS and the TAG is configured by using RRC. In this way, provided that one SSB or SRS is indicated to the terminal device as the first signal, the terminal device performs uplink transmission by using a TA or a TAG corresponding to the SSB or the SRS. In addition to the SSB, an association relationship is also established, by using the foregoing method, between a signal of another type mentioned above and the TA or the TAG. In addition to RRC configuration, the association relationship between the first signal and the TAG is indicated by using other signaling, for example, a MAC-CE message or a DCI message.

The CSI-RS is one or more of the following: a CSI-RS in a CSI-RS resource set configured with a repetition (repetition) parameter, a CSI-RS in a CSI-RS resource set configured with TRS information (a trs-info parameter), a CSI-RS in a CSI-RS resource set configured with neither the repetition parameter nor the TRS information parameter, a periodic CSI-RS, a semi-persistent CSI-RS, or an aperiodic CSI-RS. In addition, the CSI-RS is alternatively a combination of the foregoing plurality of types. For example, the CSI-RS is both the CSI-RS in the CSI-RS resource set configured with the repetition parameter and the periodic CSI-RS, that is, a periodic CSI-RS in the CSI-RS resource set configured with the repetition parameter. For another example, the CSI-RS is both the CSI-RS in the CSI-RS resource set configured with the repetition parameter and the semi-persistent CSI-RS, that is, a semi-persistent CSI-RS in the CSI-RS resource set configured with the repetition parameter. For still another example, the CSI-RS is both the CSI-RS in the CSI-RS resource set configured with the TRS information and the periodic CSI-RS, that is, a periodic CSI-RS in the CSI-RS resource set configured with the TRS information.

The terminal determines, based on a spatial relationship between signals, the first TA or the first TAG corresponding to the uplink signal, and the network device does not need to additionally indicate the first TA or the first TAG. In this way, a quantity of interactions between the network device and the terminal is reduced, thereby reducing communication overheads, and improving communication efficiency.

The implicit indication is implemented by using the QCL information, the spatial relationship, and a beam reference relationship, which are separately described below.

(a) QCL Information Implementation

The network device sends the second information to the terminal. Correspondingly, the terminal receives the second information from the network device. The second information indicates the first signal. Specifically, the second information is the QCL information. The QCL information includes a reference signal resource, namely, the first signal, and is carried in a TCI state. A type of the QCL information includes one or more of the following: a type A (type A), a type B (type B), a type C (type C), a type D (type D), a type E (type E), a type F (type F), or a type G (type G). The TCI state is an information structure, and includes beam-related information, for example, an index of a TCI (tci-StateId), and a plurality of pieces of QCL information, for example, two pieces of QCL information. Each piece of QCL information includes one reference signal (reference signal) resource, for example, the first signal, and the type of the QCL information. In this way, the terminal determines, based on the type of the QCL information, that the TA or the TAG corresponding to the first signal, for example, the first TA or the first TAG, is used for uplink transmission. Details are described below.

During uplink transmission and downlink transmission, meanings of reference signal resources in type-A QCL information are different. During uplink transmission, the reference signal resource in the type-A QCL information is used to determine a TA or a TAG used for uplink transmission. In other words, the terminal sends the uplink signal by using the TA or the TAG corresponding to the reference signal resource in the type-A QCL information. During downlink transmission, the reference signal resource in the type-A QCL information is used to determine {a Doppler frequency shift, Doppler spread, an average delay, and delay spread} of a downlink signal. Specifically, the type-A QCL information further includes indication information (denoted as indication information 1), indicating whether the type-A QCL information is used for uplink transmission or downlink transmission. In response to the indication information 1 indicating that the type-A QCL information is used for downlink transmission, the type-A QCL information is used to determine {the Doppler frequency shift, the Doppler spread, the average delay, and the delay spread} of the downlink signal. In response to the indication information 1 indicating that the type-A QCL information is used for uplink transmission, the type-A QCL information indicates a TA or a TAG used for uplink transmission, for example, the first TA or the first TAG. In other words, the reference signal resource in the type-A QCL information is a referenced object, and uplink transmission using the type-A QCL information uses a TA or a TAG the same as that of the reference signal resource in the type-A QCL information.

Similar to the type-A QCL information, during uplink transmission and downlink transmission, meanings of reference signal resources in type-B QCL information are different. During uplink transmission, the reference signal resource in the type-B QCL information is used to determine a TA or a TAG used for uplink transmission. In other words, the terminal sends the uplink signal by using the TA or the TAG corresponding to the reference signal resource in the type-B QCL information. During downlink transmission, the reference signal resource in the type-B QCL information is used to determine {a Doppler frequency shift and Doppler spread} of a downlink signal. Specifically, the type-B QCL information further includes indication information (denoted as indication information 2), indicating whether the type-B QCL information is used for uplink transmission or downlink transmission. In response to the indication information 2 indicating that the type-B QCL information is used for downlink transmission, the type-B QCL information is used to determine {the Doppler frequency shift and the Doppler spread} of the downlink signal. In response to the indication information 2 indicating that the type-B QCL information is used for uplink transmission, the type-B QCL information indicates a TA or a TAG used for uplink transmission, for example, the first TA or the first TAG. In other words, the reference signal resource in the type-B QCL information is a referenced object, and uplink transmission using the type-B QCL information uses a TA or a TAG the same as that of the reference signal resource in the type-B QCL information.

Similar to the type-A QCL information, during uplink transmission and downlink transmission, meanings of reference signal resources in type-C QCL information are different. During uplink transmission, the reference signal resource in the type-C QCL information is used to determine a TA or a TAG used for uplink transmission. In other words, the terminal sends the uplink signal by using the TA or the TAG corresponding to the reference signal resource in the type-C QCL information. During downlink transmission, the reference signal resource in the type-C QCL information is used to determine {a Doppler frequency shift and an average delay} of a downlink signal. Specifically, the type-C QCL information further includes indication information (denoted as indication information 3), indicating whether the type-C QCL information is used for uplink transmission or downlink transmission. In response to the indication information 3 indicating that the type-C QCL information is used for downlink transmission, the type-C QCL information is used to determine {the Doppler frequency shift and the average delay} of the downlink signal. In response to the indication information 3 indicating that the type-C QCL information is used for uplink transmission, the type-C QCL information indicates a TA or a TAG used for transmission, for example, the first TA or the first TAG. In other words, the reference signal resource in the type-C QCL information is a referenced object, and uplink transmission using the type-C QCL information uses a TA or a TAG the same as that of the reference signal resource in the type-C QCL information.

During uplink transmission, in addition to indicating an uplink transmission beam, type-D QCL information further indicates a TA or a TAG corresponding to uplink transmission. In other words, a reference signal resource in the type-D QCL information is a referenced object, and uplink transmission using the type-D QCL information uses a TA or a TAG the same as that of the reference signal resource in the type-D QCL information.

Type-E QCL information or type-F QCL information is a new type of QCL information. The type-E QCL information or the type-F QCL information is directly used for the TA or the TAG corresponding to uplink transmission. In other words, a reference signal resource in the type-E QCL information or the type-F QCL information is a referenced object, and uplink transmission using the type-E QCL information or the type-F QCL information uses a TA or a TAG the same as that of the reference signal resource in the type-E QCL information or the type-F QCL information. The new QCL information type being the type E or the type F is merely an example listed for ease of description, and the new QCL information type is alternatively replaced with a type 1, a type 2, a type 3, or the like, or is replaced with a type H, the type G, or the like. This is not limited in at least one embodiment.

For the terminal, the terminal is configured with an association relationship between a reference signal resource in the QCL information and a TA or a TAG corresponding to the reference signal resource, for example, the association relationship between the SSB and the TA or the TAG, the association relationship between the SRS and the TA or the TAG, an association relationship between the PUCCH and the TA or the TAG, or an association relationship between the PUSCH and the TA or the TAG, namely, the association relationship between the first signal and the TA or the TAG. The TA is the first TA, the TAG is the first TAG, and the association relationship is also considered as an association relationship between the first signal and the first TA or the first TAG. Optionally, the association relationship is carried in the configuration information or any other information. This is not limited in at least one embodiment. In this way, the terminal determines, based on the type of the QCL information, that a TA or a TAG the same as that of the reference signal resource in the QCL information, namely, a TA or a TAG the same as that of the first signal, is used for uplink transmission, to determine the first TA or the first TAG based on the association relationship between the first signal and the first TA or the first TAG.

The first signal (denoted as a first signal 1) corresponding to the foregoing association relationship and the first signal (denoted as a first signal 2) corresponding to the spatial relationship reference signal of the uplink signal is a same signal or is different signals. For example, the first signal 1 is an SRS 1, the first signal 2 is an SRS 2, and the SRS 1 and the SRS 2 are different SRSs. However, a transmission beam of the SRS 1 is used for uplink transmission of the SRS 2, in other words, the SRS 1 is a spatial relationship reference signal of the SRS 2, and there is a beam reference relationship between the SRS 1 and the SRS 2. For another example, the first signal 1 is an SSB, and the first signal 2 is an SRS. A reception beam of the SSB is used for uplink transmission of the SRS, in other words, the SSB is a spatial relationship reference signal of the SRS, and there is a beam reference relationship between the SSB and the SRS. For still another example, the first signal 1 is an SRS, and the first signal 2 is a PUSCH. A transmission beam of the SRS is used for uplink transmission of the PUSCH, in other words, the SRS is a spatial relationship reference signal of the PUSCH, and there is a beam reference relationship between the SRS and the PUSCH. In response to the first signal 1 and the first signal 2 being different signals, the first signal 1 and the first signal 2 meet a beam reference relationship. For specific implementation of the beam reference relationship, refer to related descriptions in the following "(c) Beam reference relationship implementation". Details are not described herein.

(b) Spatial Relationship Implementation

Similar to implementation of the TCI state, the second information is the spatial relationship. The first signal is a spatial relationship reference signal resource in the spatial relationship, that is, a reference signal resource used to determine an uplink transmission beam. Alternatively, the first signal is a reference signal resource that is carried in the spatial relationship and that specially indicates the TA or the TAG.

(c) Beam Reference Relationship Implementation

The beam reference relationship refers to a beam reference relationship between signals. To be specific, a transmission/reception beam of a signal refers to a transmission/reception beam of another signal, or a transmission/reception beam the same as that of another signal is used for sending/receiving a signal. In two signals having the beam reference relationship, one signal is also referred to as the spatial relationship reference signal of the other signal. The beam reference relationship between signals includes but is not limited to: a beam reference relationship between uplink signals, a beam reference relationship between downlink signals, and a beam reference relationship between an uplink signal and a downlink signal.

The beam reference relationship between the uplink signals includes but is not limited to one or more of the following: a beam reference relationship between SRSs, where for example, a transmission beam the same as that of an SRS 1 is used for sending an SRS 2; a beam reference relationship between PUCCHs, where for example, a transmission beam the same as that of a PUCCH 1 is used for sending a PUCCH 2; a beam reference relationship between PUSCHs, where for example, a transmission beam the same as that of a PUSCH 1 is used for sending a PUSCH 2; a beam reference relationship between an SRS and a PUCCH, where for example, a transmission beam the same as that of the SRS is used for sending the PUCCH; a beam reference relationship between an SRS and a PUSCH, where for example, a transmission beam the same as that of the SRS is used for sending the PUSCH; and a beam reference relationship between a PUCCH and a PUSCH, where for example, a transmission beam the same as that of the PUSCH is used for sending the PUCCH, or a transmission beam the same as that of the PUCCH is used for sending the PUSCH.

The beam reference relationship between the downlink signals includes but is not limited to one or more of the following: a beam reference relationship between an SSB and a CSI-RS or a TRS, where for example, a reception beam the same as that of the SSB is used for receiving the CSI-RS or the TRS; a beam reference relationship between a CSI-RS and a PDCCH or a PDSCH, where for example, a reception beam the same as that of the CSI-RS is used for receiving the PDCCH or the PDSCH; a beam reference relationship between a TRS and a PDCCH or a PDSCH, where for example, a reception beam the same as that of the TRS is used for receiving the PDCCH or the PDSCH; or a beam reference relationship between a PDCCH and a PDSCH, where for example, a reception beam the same as that of the PDSCH is used for receiving the PDCCH, or a reception beam the same as that of the PDCCH is used for receiving the PDSCH. The beam reference relationship of the downlink signal has a specific hierarchical relationship. The downlink signal refers to a reception beam of an SSB. In other words, the SSB is a reference source of the downlink signal.

The beam reference relationship between an uplink signal and a downlink signal includes but is not limited to one or more of the following: a beam reference relationship between an SRS and a downlink signal, a beam reference relationship between a PUSCH and a downlink signal, or a beam reference relationship between a PUCCH and a downlink signal. In other words, a reception beam of one or more of the following of a downlink signal is used as a transmission beam of an SRS: an SSB, a CSI-RS, a TRS, a PDCCH, or a PDSCH.

For the terminal, the beam reference relationship between signals (including the beam reference relationship of the uplink signal) is preconfigured on the terminal. The terminal determines, based on the beam reference relationship of the uplink signal, that the first signal is referenced for sending the uplink signal, so that a transmission beam that is the same as that of the first signal is to be used for sending the uplink signal. The terminal device determines the first TA or the first TAG by using the beam reference relationship. Specifically, for one uplink signal, a TA or a TAG of the uplink signal is determined based on a reference signal that determines an uplink transmission beam of the uplink signal. In other words, in response to a transmission beam of one uplink signal being determined based on one reference signal, the uplink signal uses a TA or a TAG corresponding to the reference signal as a TA or a TAG used for uplink sending of the uplink signal.

The foregoing describes how to determine a TA or a TAG by using the first signal. The first signal is one of a spatial relationship reference signal, a path loss reference signal, or a TA reference signal. In response to a first signal corresponding to one uplink signal not directly corresponding to a TA or a TAG, a TA or a TAG corresponding to another signal associated with the first signal is used. The another signal is a spatial relationship reference signal, a path loss reference signal, a timing reference signal, a frequency offset reference signal, or a TA reference signal of the first signal. The following uses an example in which the another signal is a spatial relationship reference signal for description. This principle is also applicable to a case in which the another signal is a path loss reference signal or a TA reference signal. For example, a PUCCH uses an SRS as a spatial relationship reference signal, and the SRS has no corresponding TA or TAG. In this case, a corresponding TA or TAG of a spatial relationship reference signal of the SRS, for example, a CSI-RS, is used. In response to the CSI-RS not having a corresponding TA or TAG either, a corresponding TA or TAG of a spatial relationship reference signal corresponding to the CSI-RS, for example, one SSB, is used. In other words, source tracing is performed based on the beam reference relationship until a level of reference signal having a corresponding TA or TAG is found, or source tracing is directly performed to a source SSB, and a TA or a TAG corresponding to the SSB is used.

In at least one embodiment, the terminal determines the first TA or the first TAG is used as an example. The terminal alternatively determines another TA or TAG, for example, a second TA or the second TAG. This is not limited in at least one embodiment.

In conclusion, the method provided in the foregoing embodiment that in response to one cell of the network device corresponding to a plurality of stations, the terminal configures a plurality of TAs or a plurality of TAGs corresponding to the cell. In this way, in response to performing uplink transmission with a station of the network device, the terminal selects a proper TA or TAG, for example, the first TA or the first TAG, to send the corresponding uplink signal, to enable uplink transmission of the terminal to be synchronized with the plurality of stations and avoid a performance loss of uplink transmission.

Optionally, with reference to the foregoing embodiment, in a first application scenario, a plurality of TAs or TAGs are used for PUSCH transmission. For example, a DCI message for scheduling the PUSCH transmission indicates the plurality of TAs or TAGs, or a DCI message for scheduling the PUSCH transmission indicates a plurality of SRSs, for example, two SRSs, and each SRS corresponds to a different TA or TAG. For example, a first SRS corresponds to the first TA or the first TAG, and a second SRS corresponds to the second TA or the second TAG. The terminal performs PUSCH transmission by using the plurality of TAs or TAGs. Specifically, how to perform PUSCH transmission by using the plurality of TAs or TAGs depends on a PUSCH transmission mode. In response to the PUSCH transmission mode being a time-division transmission model, a corresponding TA or TAG is used for uplink transmission of each PUSCH. For example, numbers of two TAs or TAGs corresponding to time-division PUSCH transmission are respectively #1 and #2. A sequence of the TAs or TAGs used for the time-division PUSCH transmission is {#1, #2, #1, #2, . . . }, in other words, the two TAs or TAGs are alternately used for the PUSCH transmission. The foregoing transmissions correspond to a same or different redundancy versions of a same PUSCH, or correspond to different PUSCHs. In response to the PUSCH transmission mode being a simultaneous transmission model, the PUSCH is transmitted by using a plurality of TAs or TAGs simultaneously.

In response to the PUSCH being transmitted by using the plurality of TAs or TAGs, each of a plurality of transport streams corresponding to the PUSCH uses a corresponding TA or TAG. For example, one PUSCH transport stream includes two parts: a first transport stream and a second transport stream. The terminal transmits the first transport stream by using the first TA or the first TAG, and transmits the second transport stream by using the second TA or the second TAG. The first transport stream and the second transport stream each include one or more transport streams. The PUSCH transport stream corresponds to the TA or the TAG in the following manners.

Manner 1: Perform division based on a code division multiplexing (CDM) group of a demodulation reference signal (DMRS) port. Specifically, a plurality of transport streams correspond to a plurality of DMRS ports, and each transport stream corresponds to one DMRS port. The network device indicates a DMRS port of a PUSCH by using DCI. DMRSs of a PUSCH is divided into a plurality of CDM groups. A correspondence between a transport stream and a plurality of TAs or TAGs is divided based on CDM groups. In other words, different CDM groups correspond to different TAs or TAGs. In this way, the plurality of TAs or TAGs are respectively used to transmit transport streams corresponding to a plurality of CDM groups. A plurality of TAs or TAGs is used to simultaneously transmit a PUSCH only under a specific condition. The specific condition includes one or a combination of the following: A quantity of transport streams is greater than X (where X is an integer, for example, X=1 or X=2). A quantity of CDM groups is greater than Y (where Y is an integer, for example, Y=1).

Manner 2: Perform even division based on a quantity of DMRS ports. A plurality of DMRS ports corresponding to a PUSCH are divided into a plurality of groups, and each group corresponds to one TA or TAG. The following specifically uses two TAs or TAGs as an example for description. In response to the quantity of the DMRS ports not being evenly divided, for example, in response to the quantity of the DMRS ports being an odd number, and the DMRS ports not being evenly divided into two groups, a first group has one more DMRS port than a second group. In other words, a quantity of DMRSs in the first group is N/2 (rounded up), N is a quantity of DMRS ports, and remaining ports are in the second group.

Manner 3: The first two ports correspond to the first TA or TAG, and remaining ports correspond to the second TA or TAG.

Manner 4: The DCI directly indicates two groups of DMRS ports corresponding to two TAs or TAGs. The terminal device directly determines, by using the DCI indication, the two groups of DMRS ports corresponding to the two TAs or TAGs. In this method, a plurality of TAs or TAGs is used only in response to a quantity of ports being greater than 2. In addition, the correspondence between the plurality of transport streams of the PUSCH and the plurality of TAs or TAGs is alternatively determined based on a correspondence between the plurality of transport streams of the PUSCH and a plurality of uplink transmission beams. Each TA or TAG corresponds to one uplink transmission beam. Specific transport streams corresponding to the uplink transmission beam are specific transport streams corresponding to the TA or the TAG corresponding to the uplink transmission beam.

Optionally, with reference to the foregoing embodiment, in a second application scenario, the first TA or the first TAG corresponding to the uplink signal is predefined by the protocol. For example, the first TA or the first TAG is one or more of the following: the $1^{st}$ TAG/the last TAG/a TAG having a smallest index/a TAG having a largest index in a plurality of TAGs corresponding to a cell in which the terminal is located, a TA corresponding to the $1^{st}$ TAG/the last TAG/the TAG having the smallest index/the TAG having the largest index in the plurality of TAGs corresponding to the cell in which the terminal is located, a TAG or TA corresponding to the $1^{st}$ PUCCH/the last PUCCH/a PUCCH having a smallest index/a PUCCH having a largest index in all PUCCHs of the cell in which the terminal is located, a TAG or TA corresponding to the $1^{st}$ PUSCH/the last PUSCH/a PUSCH having a smallest index/a PUSCH having a largest index in all PUSCHs of the cell in which the terminal is located, a TAG or TA corresponding to the $1^{st}$ SRS set/the last SRS set/an SRS set having a smallest index/an SRS set having a largest index in all SRS sets of the cell in which the terminal is located, a TAG or TA corresponding to a PDCCH for scheduling the PUSCH, a TAG or TA corresponding to a CORESET group in which the PDCCH for scheduling the PUSCH is located, a TAG or TA corresponding to the 1st CORESET/the last CORESET/a CORESET having a smallest index/a CORESET having a largest index in a CORESET group of the cell in which the terminal is located, or a TAG or TA corresponding to the 1st CORESET/the last CORESET/a CORESET having a smallest index/a CORESET having a largest index in all CORESETs detected by the terminal last time. This is not limited in at least one embodiment. The TAG or TA corresponding to the CORESET or the CORESET group is a TAG or TA corresponding to a PDSCH that carries the CORESET or the CORESET group, or is a TAG or TA corresponding to an SSB referenced by the PDSCH.

Optionally, with reference to the foregoing embodiment, in a third application scenario, the explicit indication and the implicit indication is implemented in combination. Details are as follows:

Manner A: Explicit indication is preferred.

That the explicit indication is preferred means that the terminal uses an explicitly indicated TA or TAG, for example, the first TA or the first TAG indicated by the first information, as the TA or the TAG used for sending the uplink signal. In other words, regardless of whether the network device implicitly indicates the terminal, the terminal always uses the explicitly indicated TA or TAG to send the uplink signal. In addition, for specific implementation of the explicit indication, refer to related descriptions in the foregoing "Manner 1: Explicit indication". Details are not described herein again.

Manner B: Implicit indication is preferred.

That the implicit indication is preferred means that the terminal determines a TA or a TAG based on the implicit indication, for example, the first TA or the first TAG corresponding to the first signal, to use the TA or the TAG as the TA or the TAG used for sending the uplink signal. In other words, regardless of whether the network device explicitly indicates the terminal, the terminal always uses the TA or the TAG corresponding to the implicit indication to send the uplink signal. In addition, for specific implementation of the implicit indication, refer to related descriptions in the foregoing "Manner 2: Implicit indication". Details are not described herein again.

Manner C: Compatible with the explicit indication and the implicit indication.

Compatible with the explicit indication and the implicit indication means that the terminal sends an uplink signal by using the explicitly indicated TA or TAG, or sends an uplink signal by using the TA or the TAG corresponding to the implicit indication. In this case, for a same uplink signal, the explicitly indicated TA or TAG should be consistent with the TA or the TAG corresponding to the implicit indication. For different uplink signals, the explicitly indicated TA or TAG is consistent with or inconsistent with the TA or the TAG corresponding to the implicit indication. For example, a TA is used as an example. For example, the terminal sends the SRS 1 by using the explicitly indicated TA 1, and then sends the SRS 2 by using the implicitly indicated TA 2. The TA 1 and the TA 2 are the same or are different. For example, the terminal sends an SRS by using an explicitly indicated TA 3, and then sends a PUSCH by using an implicitly indicated TA 4. The TA 3 and the TA 4 are the same or different. For example, the terminal sends the PUSCH 1 by using an explicitly indicated TA 5, and then sends the PUSCH 2 by using an implicitly indicated TA 6. The TA 5 and the TA 6 are the same or different. For example, the terminal sends a PUSCH by using an explicitly indicated TA 7, and then sends a PUCCH by using an implicitly indicated TA 8. The TA 7 and the TA 8 are the same or different. For example, the terminal sends the PUCCH 1 by using an explicitly indicated TA 9, and then sends the PUCCH 2 by using an implicitly indicated TA 10. The TA 9 and the TA 10 are the same or different. In addition, for different uplink signals, TAs or TAGs explicitly indicated at any two times are consistent or are inconsistent, and TAs or TAGs corresponding to any two implicit indications are consistent or are inconsistent. This is not limited in at least one embodiment. A sequence of the explicit indication and the implicit indication is not limited. For example, the terminal first sends an uplink signal based on the explicit indication, and then sends a remaining uplink signal based on the implicit indication. Alternatively, the terminal first sends an uplink signal based on the implicit indication, and then sends a remaining uplink signal based on the explicit indication. Alternatively, the explicit indication and the implicit indication are cyclically used. This is not limited in at least one embodiment.

Optionally, with reference to the foregoing embodiment, in a fourth application scenario, after S601, the network device further updates a TA value corresponding to one of the plurality of TAs, for example, a TA value corresponding to the first TA or a TA value corresponding to the first TAG. For ease of understanding, the following uses the first TA or the first TAG as an example for description. Specifically, as the terminal moves, a distance between the terminal and the network device, namely, a distance between the terminal and a station, changes accordingly, so that an existing TA value of the terminal, for example, the TA value corresponding to the first TA or the first TAG, does not match a current distance. Therefore, the network device sends, to the terminal based on the current distance, an updated TA value corresponding to the first TA or the first TAG. For example, the network device sends indication information to the terminal, and the indication information carries the index of the first TA or the index of the first TAG, and an updated TA value corresponding to the index. In this way, the terminal determines the first TA or the first TAG based on the index of the first TA or the index of the first TAG, to update, based on the updated TA value, the TA value corresponding to the first TA or the first TAG, to enable an updated TA value to match the current distance. On this basis, the TA value corresponding to the first TA or the first TAG in S603 is an updated TA value, or is a TA value that is not updated. This is not limited in at least one embodiment.

With reference to FIG. 6, the foregoing describes an overall procedure of the communication method provided in at least one embodiment. With reference to FIG. 8, the following describes in detail a procedure of the communication method shown in FIG. 6 in a specific application scenario.

For example, FIG. 8 is a schematic flowchart 2 of a communication method according to at least one embodiment. The communication method is applicable to communication between UE (the foregoing terminal) and a radio access network (RAN) device (the foregoing network device). As shown in FIG. 8, the communication method includes the following steps.

S801: The RAN device sends an RRC message to the UE. Correspondingly, the UE receives the RRC message from the RAN device.

The RRC message includes configuration information. The configuration information includes one or more of the following: a plurality of TAGs corresponding to one cell of the RAN device or a plurality of TA offsets corresponding to one cell of the RAN device. Optionally, the configuration information further includes an association relationship between a first signal and a first TA or a first TAG, the first TAG is one of the plurality of TAGs, and the first TA is one TA corresponding to one of the plurality of TA offsets. In addition, for specific implementation of S801, refer to related descriptions in S601 and S602. Details are not described herein again.

S802: The RAN device sends a RAR message to the UE. Correspondingly, the UE receives the RAR message from the RAN device.

The RAR message includes one initial TA value corresponding to a TAG in the plurality of TAGs. For specific implementation, refer to related descriptions in S602. Details are not described herein again. In addition, S802 is performed for a plurality of times, and an execution sequence of S801 and S802 is not limited.

S803: The RAN device sends a MAC-CE message to the UE. Correspondingly, the UE receives the MAC-CE message from the RAN device.

The MAC-CE message includes an updated TA value corresponding to one of a plurality of TAs. For specific implementation, refer to related descriptions in the foregoing fourth application scenario. Details are not described herein again. In addition, S803 is an optional step. To be specific, in response to moving of the terminal enabling a TA value corresponding to one of the plurality of TAs that does not match a distance between the terminal and a station, S803 is performed; otherwise, S803 does not be performed.

S804: The RAN device sends first information or second information to the UE. Correspondingly, the UE receives the first information or the second information from the RAN device.

For specific implementation of the first information, refer to related descriptions in the foregoing "Manner 1: Explicit indication". For specific implementation of the second information, refer to related descriptions in the foregoing "Manner 2: Implicit indication". Details are not described herein again. In addition, S804 is an optional step. To be specific, in response to the terminal determining a TA or a TAG based on a beam reference relationship, S804 is not performed; otherwise, S804 is performed. In addition, for overall implementation of S804, refer to related descriptions in S602. Details are not described herein again.

S805: The UE sends an uplink signal to the RAN device. Correspondingly, the RAN device receives the uplink signal from the UE.

The UE sends the uplink signal to the RAN device based on a TA value corresponding to the determined TA or TAG, so that the RAN device receives the uplink signal at start time of an uplink slot.

The communication method provided in at least one embodiment is described above in detail with reference to FIG. 6 to FIG. 8. A communication apparatus configured to perform the communication method provided in at least one embodiment is described below in detail with reference to FIG. 9 to FIG. 11.

Figure 9:
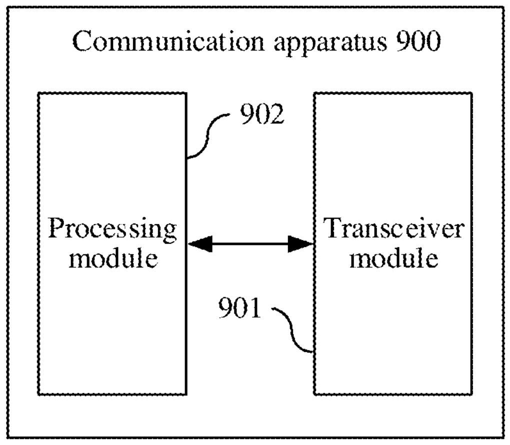
FIG. 9 is a schematic diagram 1 of a structure of a communication apparatus according to at least one embodiment.

For example, FIG. 9 is a schematic diagram 1 of a structure of a communication apparatus according to at least one embodiment. As shown in FIG. 9, a communication apparatus 900 includes modules configured to perform functions of the terminal in the method shown in FIG. 6, for example, a transceiver module 901 and a processing module 902. The transceiver module 901 is configured to implement the transceiver function in the foregoing method embodiment, and the processing module 902 is configured to implement the processing function in the foregoing method embodiment. For ease of description, FIG. 9 shows only main components of the communication apparatus.

In some embodiments, the communication apparatus 900 is used in the communication system shown in FIG. 4 or FIG. 5, and performs some functions of the terminal in the method shown in FIG. 6.

The processing module 902 is configured to determine a first TA or a first TAG, to control, based on the first TA or the first TAG, the transceiver module 901 to send a corresponding uplink signal to a network device. The first TA is one of a plurality of TAs corresponding to one cell of the network device, and the first TAG is one of a plurality of TAGs corresponding to one cell of the network device.

In a at least one embodiment, the first TA or the first TAG is determined based on first information, and the first information indicates the first TA or the first TAG corresponding to the uplink signal.

Optionally, the first information is carried in one or more of the following: an RRC message, a MAC-CE message, a DCI message, a spatial relationship, a TCI state, or QCL information.

In another at least one embodiment, the first TA or the first TAG is determined based on a first signal, and the first signal is an SSB, a spatial relationship reference signal, or a path loss reference signal corresponding to the uplink signal.

Optionally, the transceiver module 901 is further configured to receive second information from the network device. The second information indicates the first signal.

Further, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, an association relationship exists between the first signal and the first TA or the first TAG.

In a at least one embodiment, a first TA or a first TAG is determined based on a first signal, an association relationship exists between the first signal and the first TA or the first TAG, and the first signal is an SSB, a spatial relationship reference signal, or a path loss reference signal corresponding to an uplink signal.

In a at least one embodiment, the transceiver module 901 is further configured to receive configuration information from the network device before the processing module 902 determines the first TA or the first TAG. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the transceiver module 901 is further configured to receive a RAR message from the network device before the processing module 902 determines the first TA or the first TAG. The RAR message includes an initial TA value corresponding to the first TAG, and the initial TA value corresponding to the first TAG and the TA offset corresponding to the first TAG are used to determine a TA corresponding to the first TAG.

Further, the processing module 902 is further configured to determine, based on a field in the RAR message, a TAG corresponding to an initial TA value in the RAR message. Alternatively, the processing module 902 is further configured to determine, based on an SSB corresponding to the RAR message, a TAG corresponding to an initial TA value in the RAR message.

Further, the SSB corresponding to the RAR message is associated with one TAG, and the processing module 902 is further configured to determine that the TAG associated with the SSB is the TAG corresponding to the initial TA value in the RAR message.

In a at least one embodiment, the uplink signal includes one or more of the following: an SRS, a PUSCH, or a PUCCH.

Optionally, the transceiver module 901 also includes a sending module and a receiving module (not shown in FIG. 9). The sending module is configured to implement a sending function of the communication apparatus 900, and the receiving module is configured to implement a receiving function of the communication apparatus 900.

Optionally, the communication apparatus 900 further includes a storage module (not shown in FIG. 9), and the storage module stores a program or instructions. In response to the processing module executing the program or the instructions, the communication apparatus 900 is enabled to perform some functions of the terminal in the method shown in FIG. 6.

The processing module in the communication apparatus 900 is implemented by a processor or a processor-related circuit component, and is a processor or a processing unit. The transceiver module is implemented by a transceiver or a transceiver-related circuit component, and is a transceiver or a transceiver unit.

The communication apparatus 900 is a terminal, is a chip (system) or another part or component that is disposed in the terminal, or is an apparatus including the terminal. This is not limited in at least one embodiment.

In addition, for technical effects of the communication apparatus 900, refer to corresponding technical effects of the method shown in FIG. 6. Details are not described herein again.

In some other embodiments, the communication apparatus 900 is used in the communication system shown in FIG. 4 or FIG. 5, and performs some other functions of the terminal in the method shown in FIG. 6.

The transceiver module 901 is configured to receive first information from the network device. The processing module 902 is configured to control, based on a first TA or a first TAG, the transceiver module 901 to send a corresponding uplink signal to the network device. The first information indicates the first TA or the first TAG corresponding to the uplink signal. The first TA is one of a plurality of TAs corresponding to one cell of the network device, and the first TAG is one of a plurality of TAGs corresponding to one cell of the network device.

In a at least one embodiment, the first information is carried in one or more of the following: an RRC message, a MAC-CE message, a DCI message, a spatial relationship, a TCI state, or QCL information.

In a at least one embodiment, the transceiver module 901 is further configured to receive configuration information from the network device before the processing module 902 controls, based on the first TA or the first TAG, the transceiver module 901 to send the uplink signal to the network device. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the transceiver module 901 is further configured to receive a RAR message from the network device before the processing module 902 controls, based on the first TA or the first TAG, the transceiver module 901 to send the uplink signal to the network device. The RAR message includes an initial TA value corresponding to the first TAG, and the initial TA value corresponding to the first TAG and the TA offset corresponding to the first TAG are used to determine a TA corresponding to the first TAG.

Further, the processing module 902 is further configured to determine, based on a field in the RAR message, a TAG corresponding to an initial TA value in the RAR message. Alternatively, the processing module 902 is further configured to determine, based on an SSB corresponding to the RAR message, a TAG corresponding to an initial TA value in the RAR message.

Further, the SSB corresponding to the RAR message is associated with one TAG, and the processing module 902 is further configured to determine that the TAG associated with the SSB is the TAG corresponding to the initial TA value in the RAR message. In a at least one embodiment, the uplink signal includes one or more of the following: an SRS, a PUSCH, or a PUCCH.

Optionally, the transceiver module 901 also includes a sending module and a receiving module (not shown in FIG. 9). The sending module is configured to implement a sending function of the communication apparatus 900, and the receiving module is configured to implement a receiving function of the communication apparatus 900.

Optionally, the communication apparatus 900 further includes a storage module (not shown in FIG. 9), and the storage module stores a program or instructions. In response to the processing module executing the program or the instructions, the communication apparatus 900 is enabled to perform some other functions of the terminal in the method shown in FIG. 6.

The processing module in the communication apparatus 900 is implemented by a processor or a processor-related circuit component, and is a processor or a processing unit. The transceiver module is implemented by a transceiver or a transceiver-related circuit component, and is a transceiver or a transceiver unit.

The communication apparatus 900 is a terminal, is a chip (system) or another part or component that is disposed in the terminal, or is an apparatus including the terminal. This is not limited in at least one embodiment.

In addition, for technical effects of the communication apparatus 900, refer to corresponding technical effects of the method shown in FIG. 6. Details are not described herein again.

In some other embodiments, the communication apparatus 900 is used in the communication system shown in FIG. 4 or FIG. 5, and performs some other functions of the terminal in the method shown in FIG. 6.

The processing module 902 is configured to determine a first TA or a first TAG based on a first signal, to control, based on the first TA or the first TAG, the transceiver module 901 to send a corresponding uplink signal to the network device. The first signal is an SSB, a spatial relationship reference signal, or a path loss reference signal corresponding to the uplink signal. The first TA is one of a plurality of TAs corresponding to one cell of the network device, and the first TAG is one of a plurality of TAGs corresponding to one cell of the network device.

Optionally, the transceiver module 901 is further configured to receive second information from the network device. The second information indicates the first signal.

Further, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, an association relationship exists between the first signal and the first TA or the first TAG.

In a at least one embodiment, a first TA or a first TAG is determined based on a first signal, an association relationship exists between the first signal and the first TA or the first TAG, and the first signal is an SSB, a spatial relationship reference signal, or a path loss reference signal corresponding to an uplink signal.

In a at least one embodiment, the transceiver module 901 is further configured to receive configuration information from the network device before the processing module 902 determines the first TA or the first TAG based on the first signal. The configuration information includes one or more of the following: the plurality of TAGs corresponding to one cell of the network device or a plurality of TA offsets corresponding to one cell of the network device, where the plurality of TAGs include the first TAG, and the plurality of TA offsets include a TA offset corresponding to the first TAG.

Optionally, each of the plurality of TA offsets corresponds to at least a part of the plurality of TAGs.

Optionally, the transceiver module 901 is further configured to receive a RAR message from the network device before the processing module 902 determines the first TA or the first TAG based on the first signal. The RAR message includes an initial TA value corresponding to the first TAG, and the initial TA value corresponding to the first TAG and the TA offset corresponding to the first TAG are used to determine a TA corresponding to the first TAG.

Further, the processing module 902 is further configured to determine, based on a field in the RAR message, a TAG corresponding to an initial TA value in the RAR message. Alternatively, the processing module 902 is further configured to determine, based on an SSB corresponding to the RAR message, a TAG corresponding to an initial TA value in the RAR message.

Further, the SSB corresponding to the RAR message is associated with one TAG, and the processing module 902 is further configured to determine that the TAG associated with the SSB is the TAG corresponding to the initial TA value in the RAR message.

In a at least one embodiment, the uplink signal includes one or more of the following: an SRS, a PUSCH, or a PUCCH.

Optionally, the transceiver module 901 also includes a sending module and a receiving module (not shown in FIG. 9). The sending module is configured to implement a sending function of the communication apparatus 900, and the receiving module is configured to implement a receiving function of the communication apparatus 900.

Optionally, the communication apparatus 900 further includes a storage module (not shown in FIG. 9), and the storage module stores a program or instructions. In response to the processing module executing the program or the instructions, the communication apparatus 900 is enabled to perform some other functions of the terminal in the method shown in FIG. 6.

The processing module in the communication apparatus 900 is implemented by a processor or a processor-related circuit component, and is a processor or a processing unit. The transceiver module is implemented by a transceiver or a transceiver-related circuit component, and is a transceiver or a transceiver unit.

The communication apparatus 900 is a terminal, is a chip (system) or another part or component that is disposed in the terminal, or is an apparatus including the terminal. This is not limited in at least one embodiment.

In addition, for technical effects of the communication apparatus 900, refer to corresponding technical effects of the method shown in FIG. 6. Details are not described herein again.

Figure 10:
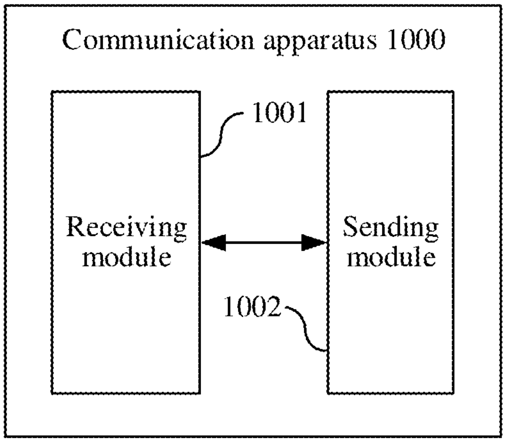
FIG. 10 is a schematic diagram 2 of a structure of a communication apparatus according to at least one embodiment.

For example, FIG. 10 is a schematic diagram 2 of a structure of a communication apparatus according to at least one embodiment. As shown in FIG. 10, a communication apparatus 1000 includes modules configured to perform functions of the network device in the method shown in FIG. 6, for example, a receiving module 1001 and a sending module 1002. The receiving module 1001 is configured to implement a receiving function in the foregoing method embodiment, and the sending module 1002 is configured to implement a sending function in the foregoing method embodiment. For ease of description, FIG. 10 shows only main components of the communication apparatus.

The communication apparatus 1000 is used in the communication system shown in FIG. 4 or FIG. 5, and performs some functions of the network device in the method shown in FIG. 6.

The sending module 1002 is configured to send configuration information to a terminal. The receiving module 1001 is configured to receive an uplink signal from the terminal. The configuration information includes one or more of the following: a plurality of TAGs corresponding to one cell of the network device or a plurality of TA offsets corresponding to one cell of the network device.

In a at least one embodiment, the sending module 1002 is further configured to send first information to the terminal before the receiving module 1001 receives the uplink signal from the terminal. The first information indicates a first TA or a first TAG corresponding to the uplink signal, the first TAG is one of the plurality of TAGs, and the first TA is one TA corresponding to one of the plurality of TA offsets.

Optionally, the first information is carried in one or more of the following: an RRC message, a MAC-CE message, a DCI message, a spatial relationship, a TCI state, or QCL information.

In another at least one embodiment, the sending module 1002 is further configured to send second information to the terminal before the receiving module 1001 receives the uplink signal from the terminal. The second information indicates a first signal, the first signal is an SSB, a spatial relationship reference signal, or a path loss reference signal corresponding to the uplink signal, the first signal is used to determine a first TA or a first TAG corresponding to the uplink signal, the first TAG is one of the plurality of TAGs, and the first TA is one TA corresponding to one of the plurality of TA offsets.

Optionally, the second information is QCL information, and a type of the QCL information includes one or more of the following: a type A, a type B, a type C, a type D, a type E, a type F, or a type G.

Optionally, the first signal includes one or more of the following: an SRS, an SSB, a CSI-RS, a TRS, a PDCCH, a PDSCH, a PUCCH, or a PUSCH.

Optionally, the configuration information further includes an association relationship between the first signal and the first TA or the first TAG.

In a at least one embodiment, the sending module 1002 is further configured to send a RAR message to the terminal before the receiving module 1001 receives the uplink signal from the terminal. The RAR message includes an initial TA value corresponding to the first TAG.

Optionally, a field in the RAR message is used to determine a TAG corresponding to an initial TA value in the RAR message; or an SSB corresponding to the RAR message is used to determine a TAG corresponding to an initial TA value in the RAR message.

Further, the SSB corresponding to the RAR message is associated with one TAG, and the TAG associated with the SSB is the TAG corresponding to the initial TA value in the RAR message.

In a at least one embodiment, the uplink signal includes one or more of the following: an SRS, a PUSCH, or a PUCCH.

In a at least one embodiment, each of the plurality of TA offsets corresponds to at least a part of the plurality of TAGs.

Optionally, the sending module 1002 and the receiving module 1001 are also integrated into one module, for example, a transceiver module (not shown in FIG. 10). The transceiver module is configured to implement a sending function and a receiving function of the communication apparatus 1000.

Optionally, the communication apparatus 1000 further includes a processing module (not shown in FIG. 10). The processing module is configured to implement a function of the network device in the method shown in FIG. 6 other than a transceiver function.

Optionally, the communication apparatus 1000 further includes a storage module (not shown in FIG. 10), and the storage module stores a program or instructions. In response to the processing module executing the program or the instructions, the communication apparatus 1000 is enabled to perform the function of the network device in the method shown in FIG. 6.

The processing module in the communication apparatus 1000 is implemented by a processor or a processor-related circuit component, and is a processor or a processing unit. The transceiver module is implemented by a transceiver or a transceiver-related circuit component, and is a transceiver or a transceiver unit.

The communication apparatus 1000 is a network device, is a chip (system) or another part or component that is disposed in the network device, or is an apparatus including the network device. This is not limited in at least one embodiment.

In addition, for technical effects of the communication apparatus 1000, refer to corresponding technical effects of the method shown in FIG. 6. Details are not described herein again.

Figure 11:
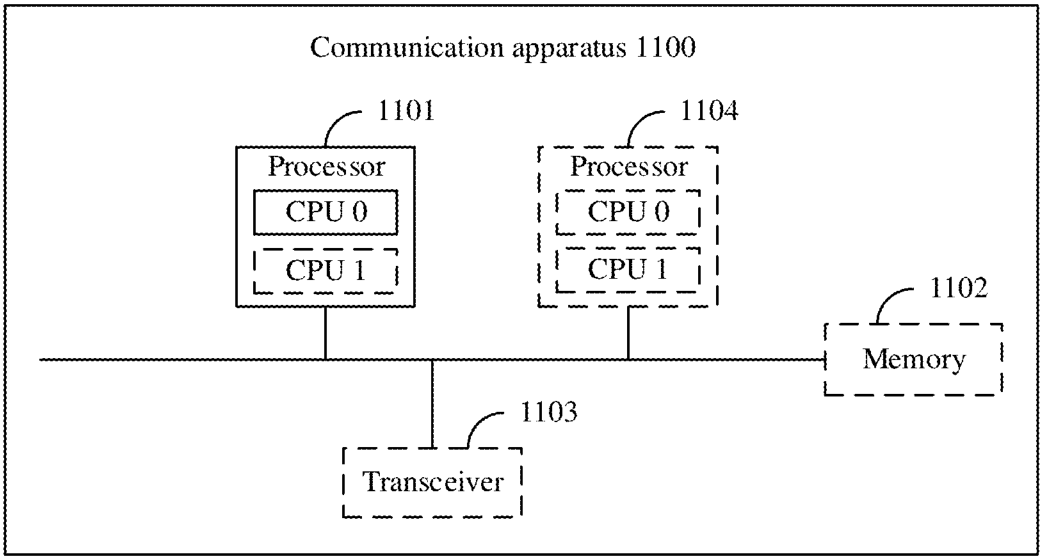
FIG. 11 is a schematic diagram 3 of a structure of a communication apparatus according to at least one embodiment.

For example, FIG. 11 is a schematic diagram 3 of a structure of a communication apparatus according to at least one embodiment. The communication apparatus is a terminal device or a network device, or is a chip (system) or another component or assembly that is disposed in the terminal device or the network device. As shown in FIG. 11, a communication apparatus 1100 includes a processor 1101. Optionally, the communication apparatus 1100 further includes a memory 1102 and/or a transceiver 1103. The processor 1101 is coupled to the memory 1102 and the transceiver 1103, for example, is connected through a communication bus.

The following specifically describes components of the communication apparatus 1100 with reference to FIG. 11.

The processor 1101 is a control center of the communication apparatus 1100, is one processor, is a collective term of a plurality of processing elements, or is referred to as a logic circuit. For example, the processor 1101 is one or more central processing units (CPUs), is an application-specific integrated circuit (ASIC), or is configured as one or more integrated circuits for implementing embodiments described herein, for example, one or more digital signal processors (DSPs), or one or more field programmable gate arrays (FPGAs).

Optionally, the processor 1101 performs a function of the network device or the terminal in the method shown in FIG. 6 by running or executing a software program stored in the memory 1102 and invoking data stored in the memory 1102.

In specific implementation, in an embodiment, the processor 1101 includes one or more CPUs, for example, a CPU 0 and a CPU 1 shown in FIG. 11.

In specific implementation, in an embodiment, the communication apparatus 1100 alternatively includes a plurality of processors, for example, the processor 1101 and the processor 1104 shown in FIG. 11. Each of the processors is a single-core processor (single-CPU), or is a multi-core processor (multi-CPU). The processor herein refers to one or more devices, circuits, and/or processing cores configured to process data (for example, computer program or instructions).

The memory 1102 is configured to store a software program for executing embodiments described herein, and the processor 1101 controls the software program, so that the method shown in FIG. 6 is performed.

Optionally, the memory 1102 is a read-only memory (ROM) or another type of static storage device that stores static information and instructions, a random access memory (RAM) or another type of dynamic storage device that stores information and instructions, an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that is used to carry or store expected program code in an instruction form or a data structure form and that is accessed by a computer, but is not limited thereto. The memory 1102 is integrated with the processor 1101, or exists independently, and is coupled to the processor 1101 through an interface circuit or an input/output interface (not shown in FIG. 11) of the communication apparatus 1100. This is not specifically limited in at least one embodiment.

The transceiver 1103 is configured to communicate with another communication apparatus. For example, the communication apparatus 1100 is a terminal, and the transceiver 1103 is configured to communicate with a network device or communicate with another terminal device. For another example, the communication apparatus 1100 is a network device, and the transceiver 1103 is configured to communicate with a terminal or communicate with another network device.

Optionally, the transceiver 1103 includes a receiver and a transmitter (not separately shown in FIG. 11). The receiver is configured to implement a receiving function, and the transmitter is configured to implement a sending function.

Optionally, the transceiver 1103 is integrated with the processor 1101, or exists independently, and is coupled to the processor 1101 through an interface circuit (not shown in FIG. 11) of the communication apparatus 1100. This is not specifically limited in at least one embodiment.

A structure of the communication apparatus 1100 shown in FIG. 11 does not constitute a limitation on the communication apparatus. An actual communication apparatus includes more or fewer components than those shown in the figure, combines some components, or has different component arrangement.

In addition, for technical effects of the communication apparatus 1100, refer to the technical effects of the communication method in the foregoing method embodiment. Details are not described herein again.

At least one embodiment provides a communication system. The communication system includes the one or more terminals and the one or more network devices.

In at least one embodiment, the processor is a CPU, or the processor is another general purpose processor, a DSP, an ASIC, a FPGA or another programmable logic device, a discrete gate or a transistor logic device, a discrete hardware component, or the like. The general-purpose processor is a microprocessor, or the processor is any conventional processor, or the like.

The memory in at least one embodiment is a volatile memory or a nonvolatile memory, or includes a volatile memory and a nonvolatile memory. The nonvolatile memory is a ROM, a programmable read-only memory (PROM), an erasable programmable read-only memory (EPROM), an EEPROM, or a flash memory. The volatile memory is a RAM, and serves as an external cache. Through example but not limitative description, many forms of RAMs is used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or a part of the foregoing embodiments are implemented by using software, hardware (such as a circuit), firmware, or any combination thereof. In response to the software being used to implement the embodiments, all or a part of the foregoing embodiments are implemented in a form of a computer program product. The computer program product includes one or more computer instructions or computer programs. In response to the computer instructions or the computer programs being loaded and executed on the computer, the procedure or functions according to at least one embodiment are all or partially generated. The computer is a general-purpose computer, a dedicated computer, a computer network, or another programmable apparatus. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, infrared, radio, and microwave, or the like) manner. The computer-readable storage medium is any usable medium accessible by the computer, or a data storage device such as a server or a data center, integrating one or more usable media. The usable medium is a magnetic medium (for example, a floppy disk, a hard disk, or a magnetic tape), an optical medium (for example, a DVD), or a semiconductor medium. The semiconductor medium is a solid-state drive.

The term "and/or" in at least one embodiment describes only an association relationship between associated objects and represents that three relationships exist. For example, A and/or B represents the following three cases: Only A exists, both A and B exist, and only B exists. A and B is singular or plural. In addition, the character "/" in at least one embodiment usually indicates an "or" relationship between the associated objects, but also indicates an "and/or" relationship. For details, refer to the context for understanding.

In at least one embodiment, at least one means one or more, and a plurality of means two or more. "At least one of the following items (pieces)" or a similar expression thereof means any combination of these items, including any combination of singular items (pieces) or plural items (pieces). For example, at least one of a, b, or c indicates: a, b, c, a-b, a-c, b-c, or a-b-c, where a, b, and c is singular or plural.

Sequence numbers of the foregoing processes do not mean execution sequences in at least one embodiment. The execution sequences of the processes should be determined according to functions and internal logic of the processes, and should not be construed as any limitation on the implementation processes of at least one embodiment.

A person of ordinary skill in the art is aware that, in combination with the examples described in embodiments disclosed in at least one embodiment, units and algorithm steps is implemented by electronic hardware or a combination of computer software and electronic hardware. Whether the functions are performed by hardware or software depends on particular applications and design constraint conditions of the technical solutions. A professional technician uses different methods to implement the described functions for at least one embodiment, but the implementation does not go beyond the scope of embodiments described herein.

A person skilled in the art understands that, for the purpose of convenient and brief description, for a detailed working process of the foregoing system, apparatus, and unit, refer to a corresponding process in the foregoing method embodiments. Details are not described herein again.

In the several embodiments provided in at least one embodiment, the disclosed system, apparatus, and method are implemented in other manners. For example, the described apparatus embodiment is merely an example. For example, division into the units is merely logical function division and is other division in actual implementation. For example, a plurality of units or components is combined or integrated into another system, or some features are ignored or not performed. In addition, the displayed or discussed mutual couplings or direct couplings or communication connections are implemented through some interfaces. The indirect couplings or communication connections between the apparatuses or units are implemented in electronic, mechanical, or other forms.

The units described as separate parts may or may not be physically separate, and parts displayed as units may or may not be physical units, are located in one location, or are distributed on a plurality of network units. Some or all of the units are selected based on actual usage to achieve the objectives of the solutions of embodiments.

In addition, functional units in at least one embodiment are integrated into one processing unit, each of the units exists alone physically, or two or more units are integrated into one unit.

In response to the functions being implemented in a form of a software functional unit and sold or used as an independent product, the functions are stored in a computer-readable storage medium. Based on such an understanding, the technical solutions of at least one embodiment essentially, or the part contributing to the conventional technology, or some of the technical solutions is implemented in a form of a software product. The computer software product is stored in a storage medium, and includes several instructions for instructing a computer device (which is a personal computer, a server, a network device, or the like) to perform all or a part of the steps in the methods described in at least one embodiment. The foregoing storage medium includes any medium that stores program code, such as a USB flash drive, a removable hard disk, a ROM, a RAM, a magnetic disk, or an optical disc.

The foregoing descriptions are merely specific implementations of at least one embodiment. However, the protection scope of at least one embodiment is not limited thereto. Any change or replacement readily figured out by a person skilled in the art within the technical scope disclosed in at least one embodiment shall fall within the protection scope of embodiments described herein. Therefore, the protection scope of embodiments described herein shall be subject to the protection scope of the claims.

What is claimed is:

1. A communication method, comprising:

receiving configuration information from a network device, wherein the configuration information includes two timing advance groups (TAGs), the two TAGs correspond to a single cell, and each TAG corresponds to a timing advance (TA) offset;

receiving two random access response (RAR) messages from the network device, wherein each random access response message is usable to indicate a TA value and a TAG index that are corresponding to one of the two TAGs, a first bit in each RAR message is usable to indicate a local index of the one TAG in the two TAGs; and determining, according to the TA value and the TA offset that are corresponding to the TAG, a TA corresponding to the TAG.

2. The method according to claim 1, wherein the local index is used to indicate one of the two TAGs.

3. The method according to claim 1, wherein the TA is used to send an uplink signal, the TA is a TA corresponding to a TAG indicated by a transmission configuration indicator (TCI) state.

4. The method according to claim 1, wherein the method further comprises:

receiving a transmission configuration indicator (TCI) state from the network device, wherein the TCI state comprises first information, and the first information indicates one of the two TAGs.

5. The method according to claim 4, wherein the method further comprises:

sending an uplink signal to the network device based on the TA corresponding to the indicated TAG.

6. A communication method, comprising:

sending configuration information to a terminal device, wherein the configuration information includes two timing advance groups (TAGs), the two TAGs correspond to a single cell, and each TAG corresponds to a timing advance (TA) offset; and sending two random access response (RAR) messages to the terminal device, wherein each random access response message is usable to indicate a TA value and a TAG index that are corresponding to one of the two TAGs, a first bit in each RAR message is usable to indicate a local index of the one TAG in the two TAGs; wherein the TA value and the TA offset that are corresponding to the TAG are used to determine a TA corresponding to the TAG.

7. The method according to claim 6, wherein the local index is used to indicate one of the two TAGs.

8. The method according to claim 6, wherein the TA is used to send an uplink signal, the TA is a TA corresponding to a TAG indicated by a transmission configuration indicator (TCI) state.

9. The method according to claim 6, wherein the method further comprises:

sending a transmission configuration indicator (TCI) state to the terminal device, wherein the TCI state comprises first information, and the first information indicates one of the two TAGS.

10. A communication apparatus, comprising:

one or more memories storing programming instructions;

at least one processor communicably coupled to the one or more memories, wherein the at least one processor is configured to execute the programming instructions to:

receive configuration information from a network device, wherein the configuration information includes two timing advance groups (TAGS), the two TAGS correspond to a single cell, and each TAG corresponds to a timing advance (TA) offset;

receive two random access response (RAR) messages from the network device, wherein each random access response message is usable to indicate a TA value and a TAG index that are corresponding to one of the two TAGs, a first bit in each RAR message is usable to indicate a local index of the one TAG in the two TAGs; and determine, according to the TA value and the TA offset that are corresponding to the TAG, a TA corresponding to the TAG.

11. The communication apparatus according to claim 10, wherein the local index is used to indicate one of the two TAGs.

12. The communication apparatus according to claim 10, wherein the TA is used to send an uplink signal, the TA is a TA corresponding to a TAG indicated by a transmission configuration indicator (TCI) state.

13. The communication apparatus according to claim 10, wherein the at least one processor is further configured to execute the programming instructions to:

receive a transmission configuration indicator (TCI) state from the network device, wherein the TCI state comprises first information, and the first information indicates one of the two TAGs.

14. The communication apparatus according to claim 13, wherein the at least one processor is further configured to execute the programming instructions to:

send an uplink signal to the network device based on the TA corresponding to the indicated TAG.

15. A communication apparatus, comprising:

one or more memories storing programming instructions;

at least one processor communicably coupled to the one or more memories, wherein the at least one processor is configured to execute the programming instructions to:

send configuration information to a terminal device, wherein the configuration information includes two timing advance groups (TAGs), the two TAGs correspond to a single cell, and each TAG corresponds to a timing advance (TA) offset; and send two random access response (RAR) messages to the terminal device, wherein each random access response message is usable to indicate a TA value and a TAG index that are corresponding to one of the two TAGs, a first bit in each RAR message is usable to indicate a local index of the one TAG in the two TAGs; wherein the TA value and the TA offset that are corresponding to the TAG are used to determine a TA corresponding to the TAG.

16. The communication apparatus of claim 15, wherein the local index is used to indicate one of the two TAGs.

17. The communication apparatus of claim 15, wherein the TA is used to send an uplink signal, the TA is a TA corresponding to a TAG indicated by a transmission configuration indicator (TCI) state.

18. The communication apparatus of claim 15, wherein the at least one processor is further configured to execute the programming instructions to:

send a transmission configuration indicator (TCI) state to the terminal device, wherein the TCI state comprises first information, and the first information indicates one of the two TAGs.

* * * * *